(12) United States Patent
Oikawa

(10) Patent No.: US 11,912,243 B2
(45) Date of Patent: Feb. 27, 2024

(54) WINDOW GLASS HEATING DEVICE

(71) Applicant: TOYOTA JIDOSHA KABUSHIKI KAISHA, Toyota (JP)

(72) Inventor: Yoshitaka Oikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 17/228,914

(22) Filed: Apr. 13, 2021

(65) Prior Publication Data
US 2021/0229635 A1    Jul. 29, 2021

Related U.S. Application Data

(63) Continuation of application No. 15/686,741, filed on Aug. 25, 2017, now Pat. No. 11,007,980.

(30) Foreign Application Priority Data

Aug. 29, 2016 (JP) .................... 2016-166493

(51) Int. Cl.
*B60S 1/02* (2006.01)
*H05B 1/02* (2006.01)
(Continued)

(52) U.S. Cl.
CPC .............. *B60S 1/026* (2013.01); *B60R 1/00* (2013.01); *B60R 16/03* (2013.01); *B60S 1/586* (2013.01);
(Continued)

(58) Field of Classification Search
CPC . B60R 16/03; B60R 1/00; B60S 1/026; B60S 1/586; H05B 1/02; H05B 1/0202;
(Continued)

(56) References Cited

U.S. PATENT DOCUMENTS 3,982,092 A * 9/1976 Marriott .............. H05B 1/0236
219/486
6,100,500 A    8/2000 Jefferson, Jr. et al.
(Continued)

FOREIGN PATENT DOCUMENTS

DE    102015222004 A1    5/2017
JP    S49-043783 Y    11/1974
(Continued)

OTHER PUBLICATIONS

Mar. 26, 2020 Restriction/Election Issued in U.S. Appl. No. 15/686,741.
(Continued)

*Primary Examiner* — Tu B Hoang
*Assistant Examiner* — Bonita Khlok
(74) *Attorney, Agent, or Firm* — Oliff PLC

(57) ABSTRACT

A window glass heating device for a vehicle is provided with a window heater configured to heat a whole area of a window glass, a window heater control unit configured to control the window heater, a camera heater that is an electric heater which heats a camera-imaging window area which is a part of the window glass included in an imaging area of a camera that images a vehicle exterior from a vehicle interior via the window glass, and a camera heater control unit configured to control supply of power to the camera heater. The camera heater control unit is configured to acquire window heater operation information, acquire a temperature of the camera heater, and control supply of power to the (Continued)

camera heater such that the temperature of the camera heater is within a predetermined temperature range based on the window heater operation information.

15 Claims, 18 Drawing Sheets

(51) Int. Cl.
    *B60R 1/00*     (2022.01)
    *B60R 16/03*     (2006.01)
    *B60S 1/58*     (2006.01)
    *H05B 3/84*     (2006.01)

(52) U.S. Cl.
    CPC .............. *H05B 1/0236* (2013.01); *H05B 3/84* (2013.01); *H05B 2203/002* (2013.01); *H05B 2203/031* (2013.01)

(58) Field of Classification Search
    CPC ................ H05B 1/0225; H05B 1/0236; H05B 2203/002; H05B 2203/007; H05B 2203/003; H05B 2203/004; H05B 2203/031; H05B 2203/035; H05B 2203/037; H05B 3/84; H05B 3/86; H05B 2203/013
    USPC ................ 219/202–203, 214, 219, 483–486, 219/490–494, 497, 508, 510–511
    See application file for complete search history.

(56) References Cited

U.S. PATENT DOCUMENTS

| | | | |
|---|---|---|---|
| 9,301,343 B2 | 3/2016 | Ishizeki et al. | |
| 2011/0233248 A1 | 9/2011 | Flemming et al. | |
| 2012/0234816 A1* | 9/2012 | Petrenko | H05B 1/0236 |
| | | | 219/203 |
| 2016/0052366 A1* | 2/2016 | Hoke | B60H 1/00785 |
| | | | 219/203 |
| 2017/0273142 A1* | 9/2017 | Denis | H05B 1/0236 |
| 2017/0347405 A1 | 11/2017 | Nagae | |

FOREIGN PATENT DOCUMENTS

| | | |
|---|---|---|
| JP | S60-088662 A | 5/1985 |
| JP | 2004-189026 A | 7/2004 |
| JP | 2013-151291 A | 8/2013 |
| JP | 2017-213981 A | 12/2017 |

OTHER PUBLICATIONS

Aug. 21, 2020 Office Action Issued in U.S. Appl. No. 15/686,741.
English translation to DE-102015222004-A1 (Year: 2015).
Jan. 27, 2021 Notice of Allowance issued in U.S. Appl. No. 15/686,741.

\* cited by examiner

WINDOW GLASS HEATING DEVICE

INCORPORATION BY REFERENCE

This is a continuation application of U.S. patent application Ser. No. 15/686,741 filed Aug. 25, 2017, which is based on and claims priority to Japanese Patent Application No. 2016-166493 filed Aug. 29, 2016. The disclosure of each of the prior applications is hereby incorporated by reference in its entirety.

BACKGROUND

1. Technical Field

The technical field relates to a window glass heating device that prevents or removes fog of window glass of a vehicle by heating the window glass.

2. Description of Related Art

A window glass heating device that prevents or removes fog of (hereinafter referred to as defogging) window glass of a vehicle by heating the window glass is known (for example, see Japanese Patent Application Publication No. 2004-189026 (JP 2004-189026 A)). The window glass heating device supplies power to an electric heating wire which is embedded in window glass and heats the whole window glass when an operation switch is operated by a user.

SUMMARY

Recently, vehicles including cameras for detecting objects (obstacles such as other vehicles and pedestrians) in front of the vehicles have been known. Such a camera images a vehicle exterior from a vehicle interior via window glass (front glass).

A driver operates an operation switch to remove fog when the window glass fogs. However, even when fog in a viewing angle area of the driver is removed, fog may remain in a camera-imaging window area which is a part of the window glass included in an imaging area of the camera. For example, such a problem may occur when the driver returns the operation switch to an OFF state after a short time. In this case, an object in front of the vehicle may not be detected well.

Such a problem can be solved by providing a heater that periodically heats the camera-imaging window area of the window glass from the camera side (the vehicle interior side) on the camera side to defog the camera-imaging window area. According to this configuration, the camera-imaging window area can always be kept in a defogged state without the operation switch being operated even when a user turns off the operation switch after a short time.

However, since the heater provided on the camera side (hereinafter referred to as a camera heater) needs to be provided in the vicinity of the window glass, the camera heater may be overheated by radiant heat from the window glass heated by the electric heating wire and heat generated from the camera heater. In this case, for example, there is concern that members composed of the camera heater will be deformed and badly affect a sensing function of the camera.

The disclosure provides a window glass heating device that can appropriately maintain a function of a camera by preventing a camera heater from being overheated.

According to a first aspect, there is provided a window glass heating device for a vehicle, including: a window heater that heats a whole area of window glass of the vehicle to defog the window glass; a window heater control unit that controls operation of the window heater based on an operation on an operation switch; a camera heater that is an electric heater which heats a camera-imaging window area which is a part of the window glass included in an imaging area of a camera that images a vehicle exterior from a vehicle interior via the window glass; and a camera heater control unit that controls supply of power to the camera heater to defog the camera-imaging window area, wherein the camera heater control unit is configured to acquire window heater operation information which is operation information on operation of the window heater and to limit supply of power to the camera heater when it is estimated that the camera heater is potentially overheated by heat applied from the window heater to the camera heater based on the window heater operation information.

In this case, the window heater may be a deicer that includes an electric heating wire disposed on the whole area of the window glass and that defogs the window glass by heat generated from the electric heating wire.

In the window glass heating device according to the aspect, the window heater control unit may control operation of the window heater based on the operation on the operation switch. The window heater may heat the whole area of the window glass of the vehicle to defog the window glass. A deicer that includes an electric heating wire disposed in the whole area of the window glass and defogs the window glass by heat generated from the electric heating wire, or the like may be used as the window heater. The "whole area of the window glass" in which the electric heating wire is disposed is an area in which one sheet of window glass can be heated almost as a whole and does not need to include end portions of the window glass in which defogging is substantially unnecessary.

A camera that images a vehicle exterior (that senses an object or the like) via the window glass may be disposed in the vehicle interior. When the window glass in an imaging area of the camera fogs, imaging is not performed well.

Therefore, the window glass heating device may include a camera heater. The camera heater is an electric heater and may heat a camera-imaging window area which is a part of the window glass included in the imaging area of the camera. The camera heater control unit may control supply of power to the camera heater such that the camera-imaging window area is defogged.

Since the camera heater needs to be disposed in the vicinity of the window glass in order to defog the camera-imaging window area, there is concern that the camera heater will be overheated by heat received from the heated window glass and heat that the window glass generates.

The camera heater control unit may acquire window heater operation information which is operation information on operation of the window heater and may limit supply of power to the camera heater when it is estimated that the camera heater is potentially overheated by heat applied from the window heater to the camera heater based on the window heater operation information. For example, the camera heater control unit may determine whether an overheating condition in which it is estimated that the camera heater is potentially overheated is satisfied based on the window heater operation information and may limit supply of power to the camera heater when the overheating condition is satisfied. When the supply of power to the camera heater is limited, for example, the camera heater control unit may prohibit supply of power (stop supply of power) to the camera heater or may decrease an amount of power supplied such that an amount of heat generated from the camera heater is smaller than that in a normal state (when it is not estimated that overheating potentially occur).

Accordingly, the camera heater may be prevented from being overheated and the camera heater can be maintained in a normal state. When it is estimated that the camera heater is potentially overheated, the temperature of the camera-imaging window area is high and thus the camera-imaging window area is defogged. Accordingly, even when the supply of power to the camera heater is limited, the camera-imaging window area does not fog. As a result, it is possible to appropriately maintain a sensing function of the camera.

According to an aspect, the camera heater control unit may be configured to acquire the window heater operation information including information for determining whether the window heater operates and to limit supply of power to the camera heater in a period in which the window heater operates based on the window heater operation information.

According to the aspect, the supply of power to the camera heater is limited in a period in which the window heater operates. Accordingly, the camera heater can be prevented from being overheated.

According to an aspect, the camera heater control unit may be configured to acquire the window heater operation information including information indicating an elapsed time after the operation of the window heater stops and to limit supply of power to the camera heater in a period in which the elapsed time from stop of the operation of the window heater does not reach a set time based on the window heater operation information.

According to the aspect, the supply of power to the camera heater is limited in a period in which the window heater operates and in a period in which the elapsed time after operation of the window heater is stopped does not reach the set time. Accordingly, the camera heater can be prevented from being overheated.

According to an aspect, the camera heater control unit may be configured to control supply of power to the camera heater such that a power-supply period in which power is supplied to the camera heater and a non-power-supply period in which power is not supplied to the camera heater are alternately repeated in a period in which an ignition switch is turned on, and the camera heater control unit may be configured to acquire the window heater operation information including information for determining whether the window heater operates and to set the power-supply period of the camera heater to be shorter when the window heater operates than when the window heater does not operate.

According to an aspect, the camera heater control unit may be configured to acquire an operating time of the window heater as the window heater operation information and to set the power-supply period of the camera heater to be shorter as the operating time becomes longer.

In the aspect, the camera heater control unit controls supply of power to the camera heater such that the power-supply period in which power is supplied to the camera heater and the non-power-supply period in which power is not supplied to the camera heater are alternately repeated in the period in which the ignition switch is turned on. Accordingly, the camera-imaging window area is defogged. In this case, the power-supply period and the non-power-supply period of the camera heater may be switched, for example, based on time measured, or an estimated temperature of the camera heater may be calculated and both periods may be switched based on the estimated temperature such that the estimated temperature is maintained within a predetermined range, or may be set arbitrarily. The ignition switch is not limited to a switch that starts an engine as a drive source of the vehicle but may be a switch that starts a vehicle system when it is turned on and that stops the vehicle system when it is turned off.

The camera heater control unit sets the power-supply period of the camera heater to be shorter when the window heater operates than when the window heater does not operate. Accordingly, the camera heater can be prevented from being overheated.

According to an aspect, the camera heater control unit may be configured to acquire heating operation information indicating an operating state of a heating device that heats the window glass and to set the power-supply period of the camera heater to be shorter as a time in which the heating device operates becomes longer.

When the heating device operates, the temperature of the camera heater becomes higher when the amount of heat applied from the heating device to the window glass becomes larger. Therefore, the camera heater control unit sets the power-supply period of the camera heater to be shorter as the time in which the heating device operates becomes longer. Accordingly, the camera heater can be prevented from being overheated. For example, the camera heater control unit may calculate an estimated temperature of the camera heater in consideration of the time in which the heating device operates and stop the supply of power to the camera heater when the estimated temperature is higher than an upper-limit temperature.

According to an aspect, the camera heater control unit may be configured to acquire outside air temperature information indicating an outside air temperature and to set the power-supply period of the camera heater to be shorter as the outside air temperature becomes higher.

The temperature of the camera heater becomes higher when the outside air temperature becomes higher. Therefore, the camera heater control unit sets the power-supply period of the camera heater to be shorter as the outside air temperature becomes higher. Accordingly, the camera heater can be prevented from being overheated. For example, the camera heater control unit may calculate an estimated temperature of the camera heater in consideration of the outside air temperature and stop the supply of power to the camera heater when the estimated temperature is higher than an upper-limit temperature.

According to an aspect, the camera heater control unit may be configured to acquire source voltage information indicating a source voltage which is an output voltage of an on-board power supply device that supplies power to the camera heater and to set the power-supply period of the camera heater to be shorter as the source voltage becomes higher.

The camera heater generates heat to heat the camera-imaging window area by being supplied with power from the on-board power supply device. In this case, a current value flowing in the camera heater and an amount of heat generated from the camera heater become larger when the source voltage which is an output voltage of the on-board power supply device becomes higher. Therefore, the camera heater control unit sets the power-supply period of the camera heater to be shorter as the source voltage becomes higher. Accordingly, the camera heater can be prevented from being overheated. For example, the camera heater control unit may calculate an estimated temperature of the camera heater in consideration of the source voltage and stop the supply of power to the camera heater when the estimated temperature is higher than an upper-limit temperature.

According to an aspect, the camera heater control unit may be configured to acquire vehicle speed information indicating a running speed of the vehicle and to set the power-supply period of the camera heater to be shorter as the running speed becomes lower.

When the vehicle travels, the window glass is cooled by running wind. Accordingly, the temperature of the window glass becomes lower when the vehicle speed becomes higher. In other words, the temperature of the camera heater increased by heat of the window glass becomes higher when the vehicle speed becomes lower. Therefore, the camera heater control unit sets the power-supply period of the camera heater to be shorter as the vehicle speed becomes lower. Accordingly, the camera heater can be prevented from being overheated. For example, the camera heater control unit may calculate an estimated temperature of the camera heater in consideration of the vehicle speed and stop the supply of power to the camera heater when the estimated temperature is higher than an upper-limit temperature.

According to an aspect, the camera heater control unit may be configured to prohibit supply of power to the camera heater when the window heater operation information is not acquired.

According to an aspect, the camera heater control unit may be configured to acquire a temperature of the camera heater and to control supply of power to the camera heater such that the temperature of the camera heater is within a predetermined temperature range.

When the window heater operation information is not acquired, the camera heater control unit cannot ascertain the operating state of the window heater. Therefore, the camera heater control unit prohibits the supply of power to the camera heater (stops the supply of power to the camera heater). Accordingly, the camera heater can be prevented from being overheated.

According to an aspect, the camera heater control unit may be configured to prohibit supply of power to the camera heater in a predetermined period until an initial waiting time elapses after an ignition switch is turned on, to store the window heater operation information including information for determining whether the window heater operates in a period in which the ignition switch is previously turned on in a nonvolatile memory, and to set the initial waiting time after the ignition switch is currently turned on to be longer when the window heater operates in the period in which the ignition switch is previously turned on than when the window heater does not operate based on the information stored in the nonvolatile memory.

Heat generated by operation of the window heater may remain even when the ignition switch is turned on next time. Therefore, the camera heater control unit is configured to prohibit the supply of power to the camera heater (stop the supply of power to the camera heater) in a predetermined period until the initial waiting time elapses after the ignition switch has been turned on.

Between the case in which the window heater has operated in the period in which the ignition switch is previously turned on and the case in which the window heater has not operated, there is a higher likelihood that the temperature of the camera heater will be higher when the ignition switch is currently turned on in the case in which the window heater has operated than in the case in which the window heater has not operated.

Therefore, the camera heater control unit stores the window heater operation information including information for determining whether the window heater has operated in the period in which the ignition switch has been previously turned on in the nonvolatile memory. Then, when the window heater has operated in the period in which the ignition switch has been previously turned on, the camera heater control unit sets the initial waiting time after the ignition switch is currently turned on to be longer than when the window heater has not operated, based on the information stored in the nonvolatile memory. Accordingly, the camera heater can be prevented from being overheated.

According to an aspect, the camera heater control unit may be configured to prohibit supply of power to the camera heater in a predetermined period until an initial waiting time elapses after an ignition switch is turned on, to store the window heater operation information including information indicating a previous operating time which is a time in which the window heater operates in a period in which the ignition switch is previously turned on in a nonvolatile memory, and to set the initial waiting time after the ignition switch is currently turned on to be longer as the previous operating time becomes longer based on the information stored in the nonvolatile memory.

In the aspect, the initial waiting time is determined based on the previous operating time which is a time in which the window heater operates in the period in which the ignition switch is previously turned on. In this case, the camera heater control unit stores the window heater operation information including information indicating the previous operating time in the nonvolatile memory and sets the initial waiting time after the ignition switch is currently turned on to be longer as the previous operating time becomes longer, based on the information stored in the nonvolatile memory. Accordingly, the camera heater can be more appropriately prevented from being overheated.

According to an aspect, the camera heater control unit may be configured to acquire the window heater operation information including information for determining whether the window heater operates and may include a prohibition command issuing unit configured to output a prohibition command for prohibiting operation of the window heater to the window heater control unit when it is determined that the window heater does not operate based on the window heater operation information and supply of power to the camera heater is started.

For example, when operation of the window heater is started after the supply of power to the camera heater is started, there is concern that the camera heater will be overheated. Therefore, the prohibition command issuing unit acquires the window heater operation information including information for determining whether the window heater operates and outputs the prohibition command for prohibiting operation of the window heater to the window heater control unit when it is determined that the window heater does not operate based on the window heater operation information and the supply of power to the camera heater is started. Accordingly, the camera heater can be prevented from being overheated.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a window glass heating device according to an embodiment will be described with reference to the accompanying drawings.

Figure 1:
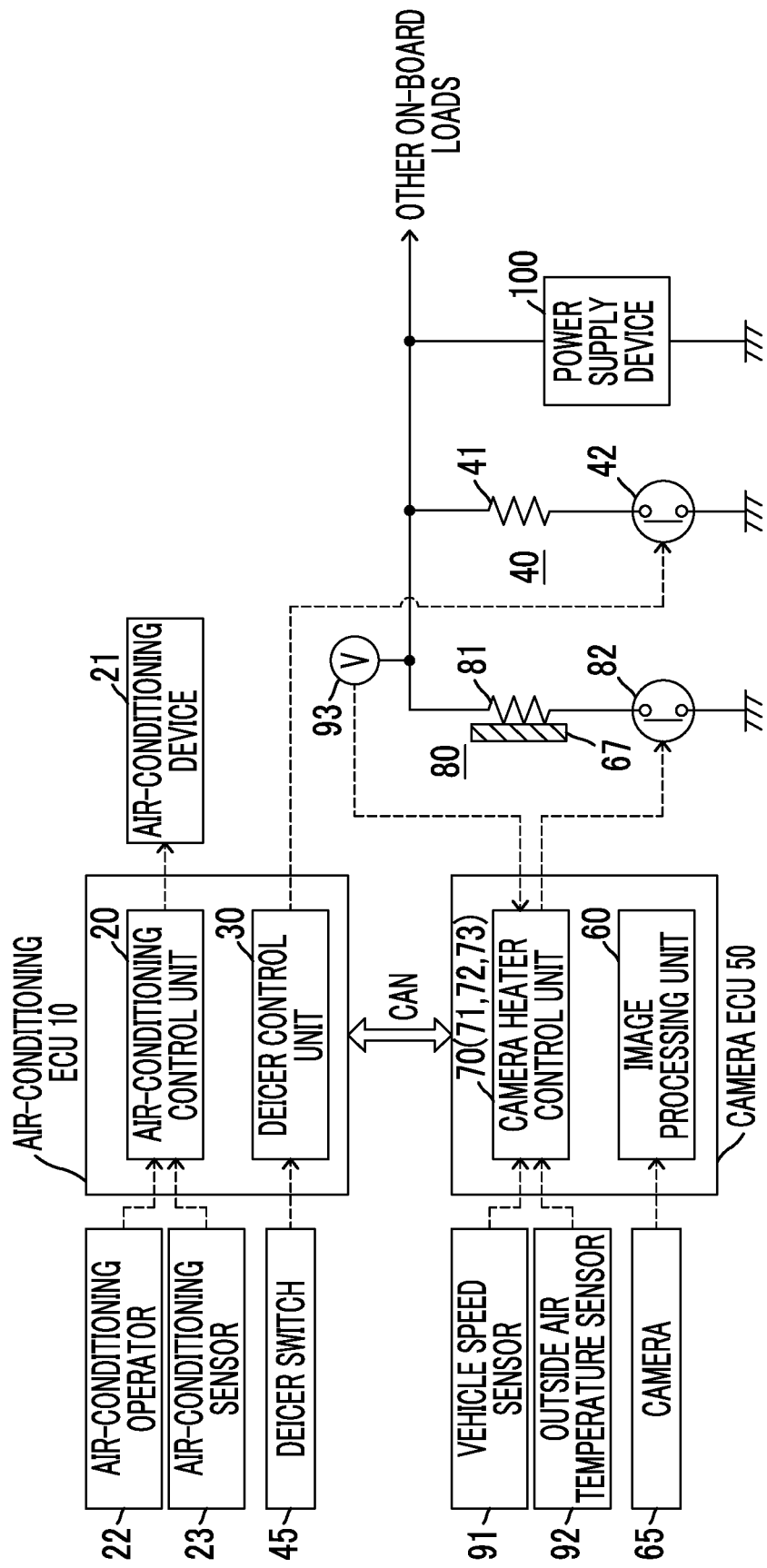
FIG. 1 is a diagram schematically illustrating a configuration of a window glass heating device according to an embodiment.
Figure 2:
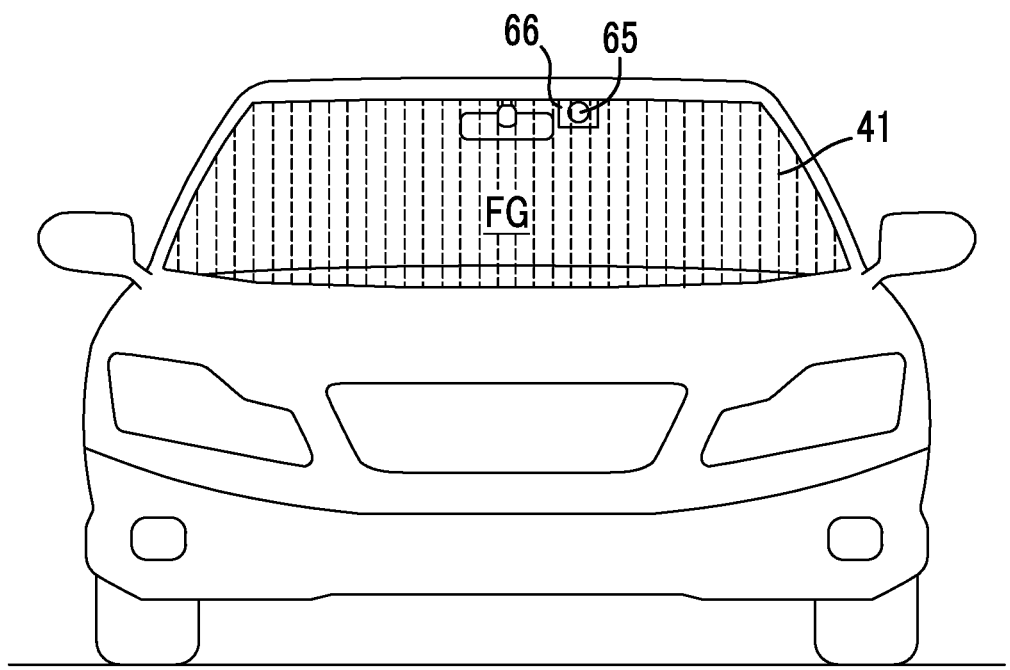
FIG. 2 is a front view of a vehicle.

A window glass heating device according to an embodiment is a device that heats front window glass FG (hereinafter referred to as front glass FG) of a vehicle illustrated in FIG. 2 to defog the front glass FG. As illustrated in FIG. 1, the window glass heating device includes an air-conditioner ECU 10 and a camera ECU 50. The ECUs 10 and 50 are electric control units including a microcomputer as a major part and are connected to transmit and receive information to and from each other via a controller area network (CAN). The ECUs 10 and 50 perform a predetermined control process in a period in which an ignition switch which is not illustrated is turned on. In this specification, the microcomputer includes a CPU, a ROM, a RAM, a nonvolatile memory, and an interface I/F. The CPU is configured to embody various functions by executing instructions (such as programs or routines) stored in the ROM.

The air-conditioner ECU 10 includes an air conditioner control unit 20 that controls air-conditioning of a vehicle interior and a deicer control unit 30 that controls defogging of the front glass FG. The air conditioner control unit 20 is connected to an air-conditioning device 21 that air-conditions the vehicle interior. The air conditioner control unit 20 is connected to an air-conditioning operator 22 that allows a user to perform various settings associated with air-conditioning and an air-conditioning sensor 23 which is required for air-conditioning control, such as a temperature sensor. The air conditioner control unit 20 controls operation of the air-conditioning device 21 based on the setting by the air-conditioning operator 22 and a detection signal from the air-conditioning sensor 23. The air-conditioning device 21 also includes a defogger to be described later.

The deicer control unit 30 is connected to a deicer 40 and a deicer switch 45. The deicer 40 has a function of melting frozen ice on the surface of the front glass FG, and is normally used to defog the front glass FG. The deicer 40 includes an electric heating wire 41 (referred to as a deicer electric heating wire 41) embedded in the whole area of the front glass FG and a relay 42 (referred to as a deicer relay 42) connected in series to the deicer electric heating wire 41. The deicer 40 is connected to a power supply device 100 of the vehicle.

The power supply device 100 is an on-board power supply device in which an on-board battery and an alternator which are not illustrated are connected in parallel, and supplies power to various on-board electrical loads including the deicer 40 and a camera heater 80 to be described later.

A deicer switch 45 is an operator which is operated by a user such as a driver and outputs an operation signal to the deicer control unit 30. When an ON signal is input from the deicer switch 45 in a period in which an ignition switch is turned on, the deicer control unit 30 turns on the deicer relay 42 to supply power to the deicer electric heating wire 41. Accordingly, the deicer electric heating wire 41 generates heat to heat the front glass FG.

The deicer control unit 30 includes a timer and turns off the deicer relay 42 to stop supply of power to the deicer electric heating wire 41 when a predetermined time elapses from a time point at which an operation signal is input. The deicer control unit 30 also turns off the deicer relay 42 to stop the supply of power to the deicer electric heating wire 41 when an OFF signal is input by operation of the deicer switch 45 before the predetermined time elapses. The deicer control unit 30 does not supply power to the deicer electric heating wire 41 in a period in which the ignition switch is turned off.

In the following description, turning on the deicer relay 42 to supply power to the deicer electric heating wire 41 may be referred to as operating the deicer 40, turning off the deicer relay 42 to cut off the supply of power to the deicer electric heating wire 41 may be referred to as stopping operation of the deicer 40, a state in which power is supplied to the deicer electric heating wire 41 may be referred to as an operating state of the deicer 40, and a state in which power is not supplied to the deicer electric heating wire 41 may be referred to as a non-operating state of the deicer 40 or a stopped state of the deicer 40. A power-supply period in which power is supplied to the deicer electric heating wire 41 may be referred to as an operating period of the deicer 40 and a non-power-supply period in which power is not supplied to the deicer electric heating wire 41 may be referred to as a non-operating period of the deicer 40.

Figure 3:
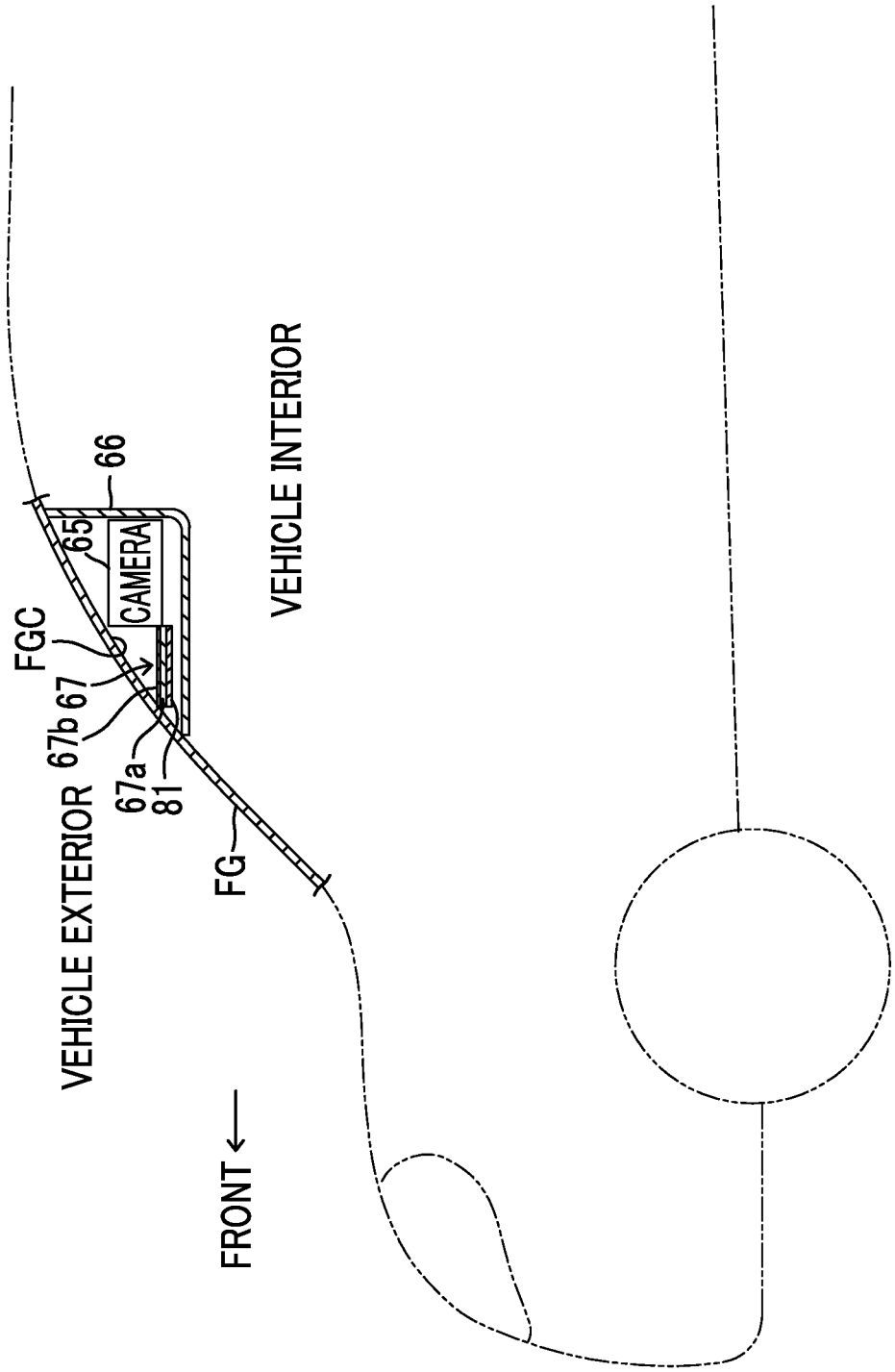
FIG. 3 is a cross-sectional view illustrating arrangement of a camera and a camera heater.

The camera ECU 50 includes an image processing unit 60 and a camera heater control unit 70. The image processing unit 60 is connected to a camera 65. As illustrated in FIG. 3, the camera 65 images an external scene in front of the vehicle from a vehicle interior via the front glass FG and outputs image data acquired by the imaging to the image processing unit 60. The image processing unit 60 detects an object (an obstacle such as a preceding vehicle, an oncoming vehicle, or a pedestrian) in front of the vehicle and lane markers such as a white line formed on a road from image data output from the camera 65 and supplies information indicating positions and the like thereof relative to the vehicle to a driving support ECU (not illustrated). The driving support ECU controls a running state of the vehicle based on the obstacle information, the lane marker information, or the like.

As illustrated in FIG. 3, the camera 65 is attached to a bracket 66 and is fixed to an upper position of the front glass FG with a lens facing the front side of the vehicle. In the camera 65, a hood 67 is disposed below the front side of the lens such that reflected light from a vehicle body does not enter the lens. The hood 67 includes a resin flat plate 67a (referred to as a hood body 67a) disposed in a horizontal direction and a non-woven fabric 67b attached to the top surface of the hood body 67a. An electric heating wire 81 (referred to as a camera electric heating wire 81) is attached to the bottom surface of the hood body 67a.

The hood 67 is disposed such that the surface thereof (a surface on which the non-woven fabric 67b is attached) obliquely faces the front glass FG. In the front glass FG, a part included in an imaging area which is used for the camera 65 to perform imaging is included in a part obliquely facing the surface of the hood 67. Hereinafter, the part of the front glass FG obliquely facing the surface of the hood 67 is referred to as a camera defogging area FGC.

The camera electric heating wire 81 is connected to the power supply device 100 via a relay 82 (referred to as a camera heater relay 82).

A vehicle speed sensor 91, an outside air temperature sensor 92, a voltage sensor 93, and the camera heater relay 82 are connected to the camera heater control unit 70. The vehicle speed sensor 91 outputs a speed detection signal indicating a running speed of the vehicle to the camera heater control unit 70. The outside air temperature sensor 92 outputs an outside air temperature detection signal indicating an outside air temperature around the vehicle to the camera heater control unit 70. The voltage sensor 93 outputs a source voltage detection signal indicating an output voltage of the power supply device 100 to the camera heater control unit 70.

The camera heater control unit 70 controls supply of power to the camera electric heating wire 81 by performing a camera heater control process to be described later to control ON and OFF of the camera heater relay 82.

The hood 67 generates heat by turning on the camera heater relay 82 to supply power to the camera electric heating wire 81, and heats the camera defogging area FGC of the front glass FG. A device that heats the camera defogging area FGC is a camera heater 80. Accordingly, the camera heater 80 includes the camera electric heating wire 81, the camera heater relay 82, and the hood 67.

A front space of the lens of the camera 65 is a sealed space surrounded by the front glass FG, the bracket 66, the hood 67, and the camera 65 (a sealed space of which the front and upper sides are covered by the front glass FG, the right and left sides are covered by the bracket 66, the lower side is covered by the hood 67, and the rear side is covered by the camera 65).

The camera heater control unit 70 defogs the camera defogging area FGC by alternately switching a power-supply period in which the camera heater 80 (accurately the camera electric heating wire 81) is supplied with power and a non-power-supply period in which the camera heater 80 (or more accurately, the camera electric heating wire 81) is not supplied with power in a period in which an ignition switch is turned on. The camera heater control unit 70 does not supply power to the camera heater 80 in a period in which the ignition switch is turned off.

In the following description, turning on the camera heater relay 82 to supply power to the camera electric heating wire 81 may be referred to as operating the camera heater 80, turning off the camera heater relay 82 to cut off the supply of power to the camera electric heating wire 81 may be referred to as stopping operation of the camera heater, a state in which power is supplied to the camera electric heating wire 81 may be referred to as an operating state of the camera heater 80, and a state in which power is not supplied to the camera electric heating wire 81 may be referred to as a non-operating state of the camera heater 80 or a stopped state of the camera heater 80. A power-supply period in which power is supplied to the camera electric heating wire 81 may be referred to as an operating period of the camera heater 80 and a non-power-supply period in which power is not supplied to the camera electric heating wire 81 may be referred to as a non-operating period of the camera heater 80.

Since the camera heater 80 is disposed in the vicinity of the front glass FG, the camera heater may be overheated by radiant heat received from the deicer 40 and heat generated from the camera electric heating wire 81. In this case, the hood 67 may be deformed by the overheating, and good imaging of the external scene using the camera 65 may be impossible. That is, the image processing unit 60 may not sense the external scene well.

Therefore, the camera heater control unit 70 prevents the camera heater 80 from being overheated and maintains a satisfactory outside sensing function using the camera 65 (which includes the image processing unit 60), by performing a camera heater control process to be described below. Several examples of the camera heater control process will be described below.

<Camera heater control process 1> First, a first example of the camera heater control process (hereinafter referred to as camera heater control process 1) which is performed by the camera heater control unit 70 will be described in brief. Here, the camera heater control unit 70 performing camera heater control process 1 is referred to as a first camera heater control unit 71. The first camera heater control unit 71 defogs the camera defogging area FGC by alternately switching the operating period (the power-supply period) in which the camera heater 80 operates and the non-operating period (the non-power-supply period) in which the camera heater 80 does not operate. The length of the operating period is set to a time tcon, and the length of the non-operating period is set to a time tcoff.

When the ignition switch is turned on, the first camera heater control unit 71 sets the camera heater 80 to the non-operating state and maintains the non-operating state for the non-operating time tcoff. When the non-operating state has been maintained for the non-operating time tcoff, the first camera heater control unit 71 switches the camera heater 80 to the operating state and maintains the operating state for the operating time tcon. In this way, the first camera heater control unit 71 alternately switches the non-operating period set to the time tcoff and the operating period set to the time tcon. Hereinafter, this process may be referred to as a basic camera heater process.

The first camera heater control unit 71 reads a deicer operating state signal (hereinafter referred to as deicer operation information) which is transmitted with a predetermined cycle from the air-conditioning ECU 10, and monitors the operating state of the deicer 40. The first camera heater control unit 71 prohibits operation of the camera heater 80 in a period matching a period in which the deicer 40 operates and a period in which a predetermined time tdoff elapses after the operation of the deicer 40 ends.

Figure 4:
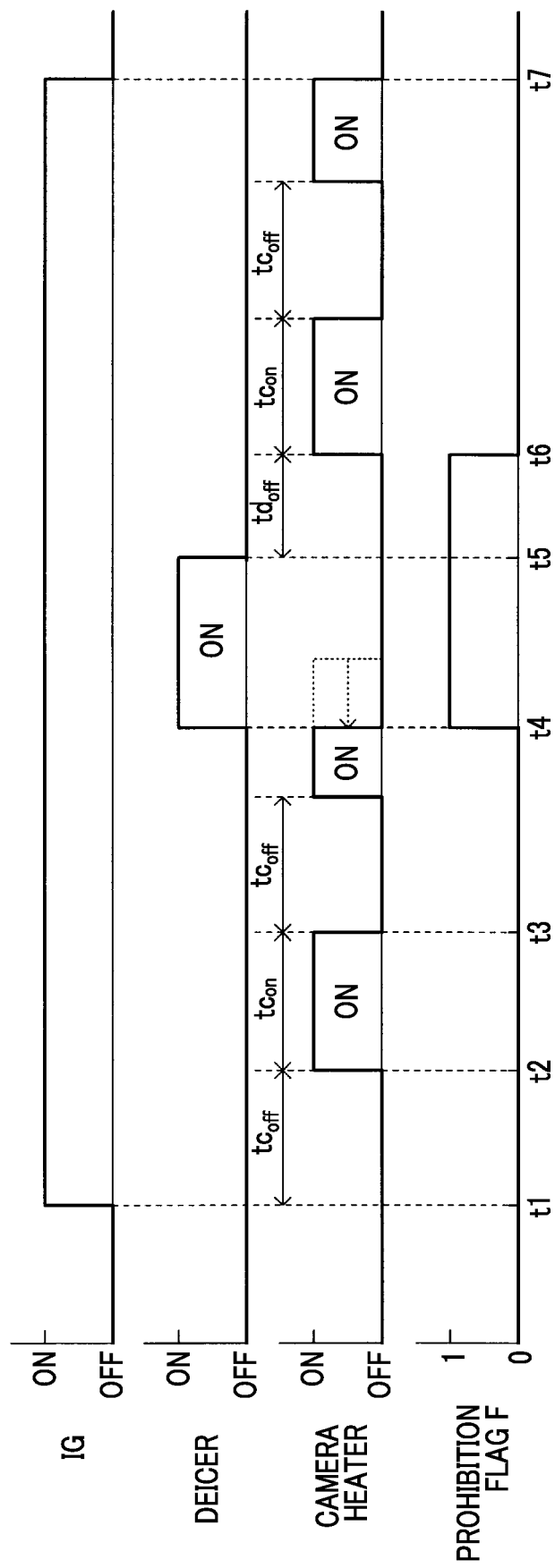
FIG. 4 is a timing chart illustrating a state of an ignition switch, an operating state of a deicer, an operating state of a camera heater, and setting of a prohibition flag.

FIG. 4 is a timing chart illustrating the state of the ignition switch (IG), the operating state of the deicer 40, the operating state of the camera heater 80, and switching of a prohibition flag F. The horizontal axis represents time. A period in which the prohibition flag F is set to "1" is a period in which operation of the camera heater 80 is prohibited. In the drawing, "ON" denotes an operating state, and "OFF" denotes a non-operating state.

As illustrated in the drawing, when the ignition switch is turned on at time t1, the first camera heater control unit 71 operates the camera heater 80 at time t2 at which the non-operating time tcoff elapses therefrom and sets the camera heater 80 to the non-operating state at time t3 at which the operating time tcon elapses. When operation of the deicer 40 is started at time t4 at which the basic camera heater process is repeated, the first camera heater control unit 71 stops the operation of the camera heater 80 at that time. When operation of the deicer 40 is ended at time t5, the first camera heater control unit 71 starts operation of the camera heater 80 at time t6 at which a predetermined time tdoff (referred to as a stop setting time tdoff) elapses from that time and restarts the basic camera heater process. The first camera heater control unit 71 ends camera heater control process 1 at time t7 at which the ignition switch is turned off.

Figure 5:
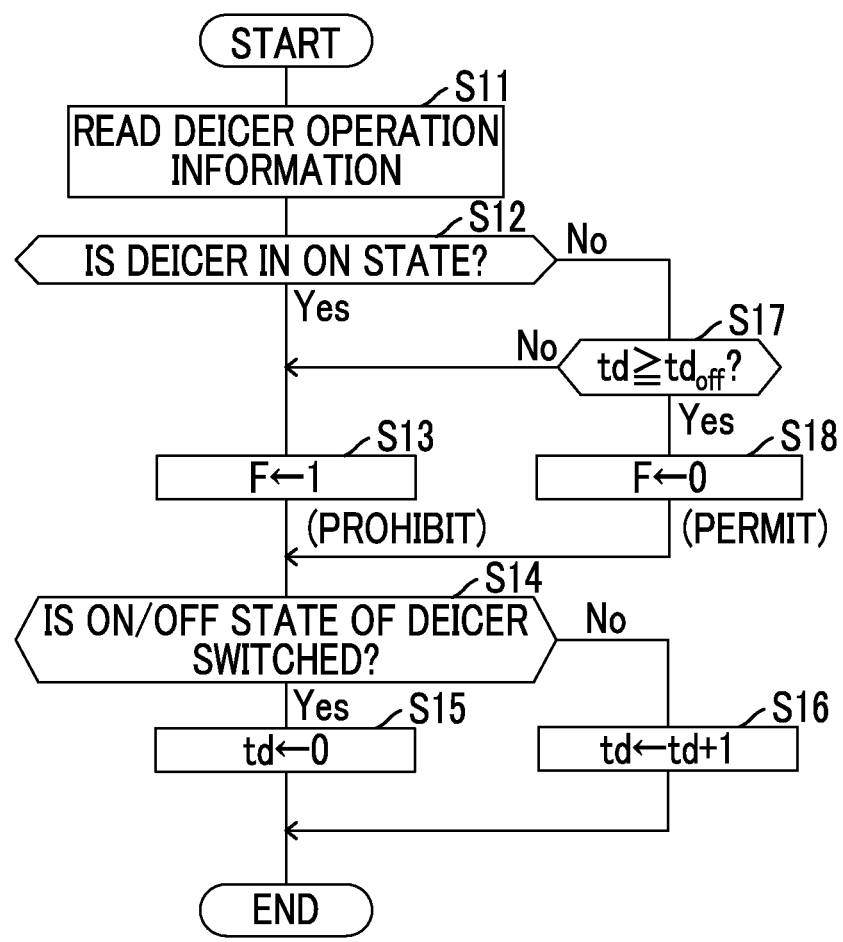
FIG. 5 is a flowchart illustrating prohibition flag setting routine 1.
Figure 6:
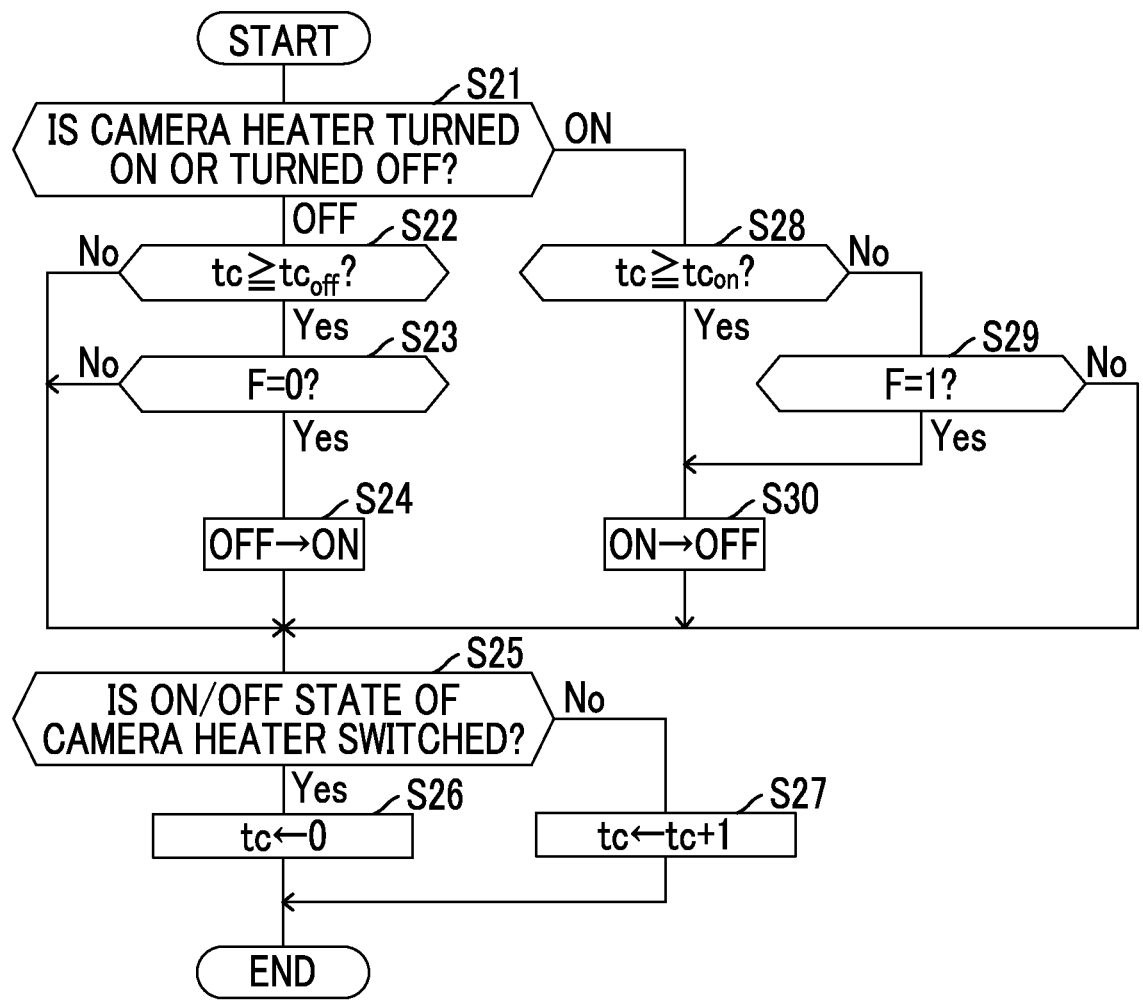
FIG. 6 is a flowchart illustrating camera heater control routine 1.

In order to perform camera heater control process 1, the first camera heater control unit 71 performs prohibition flag setting routine 1 illustrated in FIG. 5 and camera heater control routine 1 illustrated in FIG. 6. The first camera heater control unit 71 performs prohibition flag setting routine 1 and camera heater control routine 1 with a predetermined calculation cycle in the period in which the ignition switch is turned on.

<Prohibition flag setting routine 1> First, prohibition flag setting routine 1 will be described. When the prohibition flag setting routine is started, the first camera heater control unit 71 reads the deicer operation information transmitted from the air-conditioning ECU 10 in Step S11, and determines whether the deicer 40 is operating (whether the deicer relay 42 is turned on) in Step S12. When the deicer 40 is operating (YES in S12), the first camera heater control unit 71 sets a prohibition flag F to "1" in Step S13. The prohibition flag F indicates that operation of the camera heater 80 is prohibited by "1," and indicates that operation of the camera heater 80 is permitted by "0."

Subsequently, the first camera heater control unit 71 determines whether the operating state of the deicer 40 is switched in Step S14. That is, it is determined whether the operating state indicated by the deicer operation information which is read in Step S11 before one calculation cycle and the operating state indicated by the deicer operation information read in Step S11 in this time are different (the operating state→the non-operating state, or the non-operating state→the operating state).

When the operating state of the deicer 40 is switched, the first camera heater control unit 71 clears a deicer timer value td to zero in Step S15. When the operating state of the deicer 40 is not switched, the first camera heater control unit 71 increases the deicer timer value td by "1" in Step S16. Accordingly, the deicer timer value td indicates an operation duration of the deicer 40 when the deicer 40 is operating, and indicates a stop duration when the deicer 40 is stopped.

On the other hand, when it is determined in Step S12 that the deicer is not operating, the first camera heater control unit 71 determines whether the deicer timer value td is equal to or greater than a predetermined stop setting time tdoff in Step S17. When the deicer timer value td is less than the stop setting time tdoff, the first camera heater control unit 71 performs the process of Step S13. Accordingly, the prohibition flag F is set to "1." On the other hand, when the deicer timer value td is equal to or greater than the predetermined stop setting time tdoff, the first camera heater control unit 71 sets the prohibition flag F to "0" in Step S18 and then performs the process of Step S14.

An initial value of the deicer timer value td (an initial value when this routine is started by turning on the ignition switch) is set to the stop setting time tdoff. Accordingly, at the initial time of starting this routine, the prohibition flag F is set to "0."

The first camera heater control unit 71 repeatedly performs such processes with a predetermined calculation cycle and sets the prohibition flag F depending on the operating state of the deicer. Accordingly, as illustrated in FIG. 4, the prohibition flag F is set to "1" in the operation period of the deicer and the period until the stop setting time tdoff elapses after operation of the deicer is stopped, and is set to "0" in other periods.

<Camera heater control routine 1> Camera heater control routine 1 will be described below. When camera heater control routine 1 is started, the first camera heater control unit 71 determines whether the camera heater 80 is operating (the camera heater relay 82 is in an ON state) or stopped (the camera heater relay 82 is in an OFF state) in Step S21. Since the camera heater 80 stops at the time of starting of this routine (at time t4 in FIG. 4), the first camera heater control unit 71 determines whether a camera heater timer value tc is equal to or greater than a predetermined stop setting time tcoff in Step S22. An initial value of the camera heater timer value tc is set to zero.

Accordingly, at the time of starting of this routine, the determination result of Step S22 is "NO." In this case, in Step S25, the first camera heater control unit 71 determines whether the operating state of the camera heater 80 is switched (the operating state→the non-operating state, or the non-operating state→the operating state). The first camera heater control unit 71 clears the camera heater timer value tc to zero in Step S26 when the operating state of the camera heater 80 is switched (YES in S25), and increases the camera heater timer value tc by "1" in Step S27 when the operating state of the camera heater 80 is not switched (NO in S25). Accordingly, the camera heater timer value tc indicates an operation duration of the camera heater 80 when the camera heater 80 is operating, and indicates a stop duration when the camera heater 80 is stopped.

Accordingly, at the time of staring of this routine, the stop duration of the camera heater 80 is counted by the camera heater timer value tc.

The first camera heater control unit 71 repeatedly performs these processes, reads the prohibition flag F, and determines whether the prohibition flag F is "0" in Step S23 when the camera heater timer value tc reaches the stop setting time tcoff (YES in S22). The prohibition flag F has a newest value which is set in prohibition flag setting routine 1 which is performed in parallel with this routine.

When the prohibition flag F is "0" (YES in S23), the first camera heater control unit 71 starts operation of the camera heater 80 which has stopped in Step S24 (the camera heater relay 82 is turned on). Accordingly, power is supplied to the camera electric heating wire 81 (for example, at time t2 in FIG. 4). On the other hand, when the prohibition flag F is "1" (NO in S23), the first camera heater control unit 71 skips the process of Step S24. Accordingly, power is not supplied to the camera electric heating wire 81.

Subsequently, the first camera heater control unit 71 performs the process of Step S25. In this case, when operation of the camera heater 80 is started in Step S24, the operating state of the camera heater 80 is switched and thus the camera heater timer value tc is cleared to zero in Step S26. That is, counting of the operation duration is started. On the other hand, when operation of the camera heater 80 is prohibited, the operating state of the camera heater 80 is not switched and thus the camera heater timer value tc is increased by "1" in Step S27. That is, counting of the stop duration is maintained.

When operation of the camera heater 80 is started, the first camera heater control unit 71 determines whether the camera heater timer value tc is equal to or greater than a predetermined operation setting time tcon in Step S28. When the camera heater timer value tc is less than the operation setting time tcon (NO in S28), the first camera heater control unit 71 reads the prohibition flag F and determines whether the prohibition flag F is "1" in Step S29. When the prohibition flag F is "0," the routine transitions to Step S25. Accordingly, operation of the camera heater 80 is maintained and counting of the operation duration is maintained.

On the other hand, when the camera heater timer value tc reaches the predetermined operation setting time tcon (YES in S28, for example, at time t3 in FIG. 4) or when the prohibition flag F is switched to "1" in the middle thereof (YES in S29, for example, at time t4 in FIG. 4), the first camera heater control unit 71 performs the process of Step S30. In S30, the first camera heater control unit 71 stops operation of the camera heater 80 (the camera heater relay 82 is turned off). Accordingly, the supply of power to the camera electric heating wire 81 is cut off. Subsequently, the first camera heater control unit 71 performs the process of Step S25. Accordingly, the camera heater timer value tc is cleared to zero (S26).

The first camera heater control unit 71 repeatedly performs prohibition flag setting routine 1 and camera heater control routine 1 with a predetermined calculation cycle. Accordingly, as illustrated in FIG. 4, operation of the camera heater 80 is limited in the period in which the deicer 40 operates and in the period until the stop setting time tdoff elapses after operation of the deicer 40 ends. In camera heater control routine 1, the processes other than Steps S23 and S29 correspond to the basic camera heater process.

In camera heater control process 1, when both the deicer 40 and the camera heater 80 operate, the camera heater 80 is maintained in the stopped state based on an estimation result that the camera heater 80 is potentially overheated by heat generated from the camera electric heating wire 81 and radiant heat from the deicer 40. In camera heater control process 1, when the camera heater 80 operates within a predetermined time after operation of the deicer 40 is stopped, similarly, the camera heater 80 is maintained in the stopped state based on the estimation result that the camera heater 80 is potentially overheated. Accordingly, the stop setting time tdoff is set to a maximum time in which it is estimated that the camera heater 80 is potentially overheated.

According to the above-mentioned window glass heating device, operation of the camera heater 80 is limited when it is estimated that the camera heater 80 is potentially overheated by heat applied from the deicer 40 to the camera heater 80 based on the current operating state and the operation history (whether to operate and an elapsed time after the operation is stopped) of the deicer 4. Accordingly, the camera heater 80 is prevented from being overheated. As a result, the above-mentioned problem in the camera heater 80 does not occur and an external scene can be imaged well using the camera 65 via the front glass FG (the external scene can be sensed well). Since the overheated state of the camera heater 80 can be determined without using a temperature sensor, it is possible to put the window glass heating device into practice at a low cost.

<Camera heater control process 2> A second example of the camera heater control process (hereinafter referred to as camera heater control process 2) will be described below. In camera heater control process 1, operation of the camera heater 80 is prohibited such that operation of the deicer 40 and operation of the camera heater 80 do not overlap each other. On the other hand, in camera heater control process 2, when the deicer 40 is operating, the time in which the camera heater 80 operates is set to be short depending on the time for which the deicer 40 has operated. Hereinafter, the camera heater control unit 70 performing camera heater control process 2 is referred to as a second camera heater control unit 72.

Figure 7:
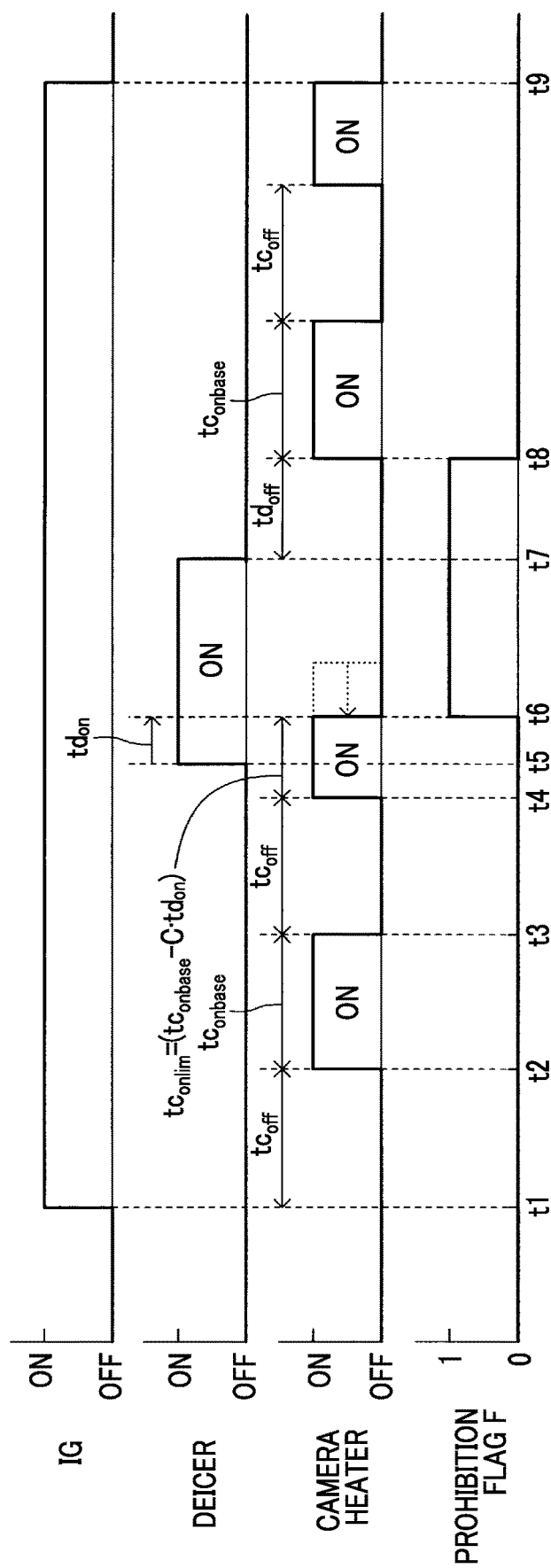
FIG. 7 is a timing chart illustrating a state of an ignition switch, an operating state of a deicer, an operating state of a camera heater, and setting of a prohibition flag.

For example, as illustrated in FIG. 7, when it is detected that operation of the deicer 40 is started at time t5 after operation of the camera heater 80 is started at time t4, the second camera heater control unit 72 does not stop operation of the camera heater 80 at that time but stops operation of the camera heater 80 at time t6 which is after time t5. The second camera heater control unit 72 sets the operating time of the camera heater 80, that is, the time from time t4 to time t6, to a time conlim which is shorter than the operation setting time tcon set in the basic camera heater process. Here, the operation setting time tcon set in the basic camera heater process is referred to as a basic operation setting time tconbase to be distinguished from the time tconlim. Since the time tconlim is set to be variable by calculation, the time tconlim is referred to as a variable operation upper-limit time tconlim.

The second camera heater control unit 72 calculates the variable operation upper-limit time using Equation (1). tconlim=tconbase−C·tdon . . . (1) Here, C denotes a predetermined coefficient, and tdon is a time after operation of the deicer 40 is started, that is, the operation duration of the deicer 40.

When the deicer 40 stops, tdon=0 is satisfied and thus the variable operation upper-limit time tconlim is set to the same value as the basic operation setting time tconbase. On the other hand, when the deicer 40 operates, the variable operation upper-limit time tconlim is set to be shorter as the operation duration becomes longer. That is, when the deicer 40 operates, the time in which operation of the camera heater 80 is permitted is set to be shorter than when the deicer 40 does not operate. As the operating time tdon of the deicer 40 becomes longer, the variable operation upper-limit time tconlim is set to be shorter. For example, as can be seen from Equation (1), the variable operation upper-limit time tconlim varies to a negative value with an increase in the operating time tdon of the deicer 40. Accordingly, at a time at which the variable operation upper-limit time tconlim becomes zero, operation of the camera heater 80 is not permitted.

Figure 8:
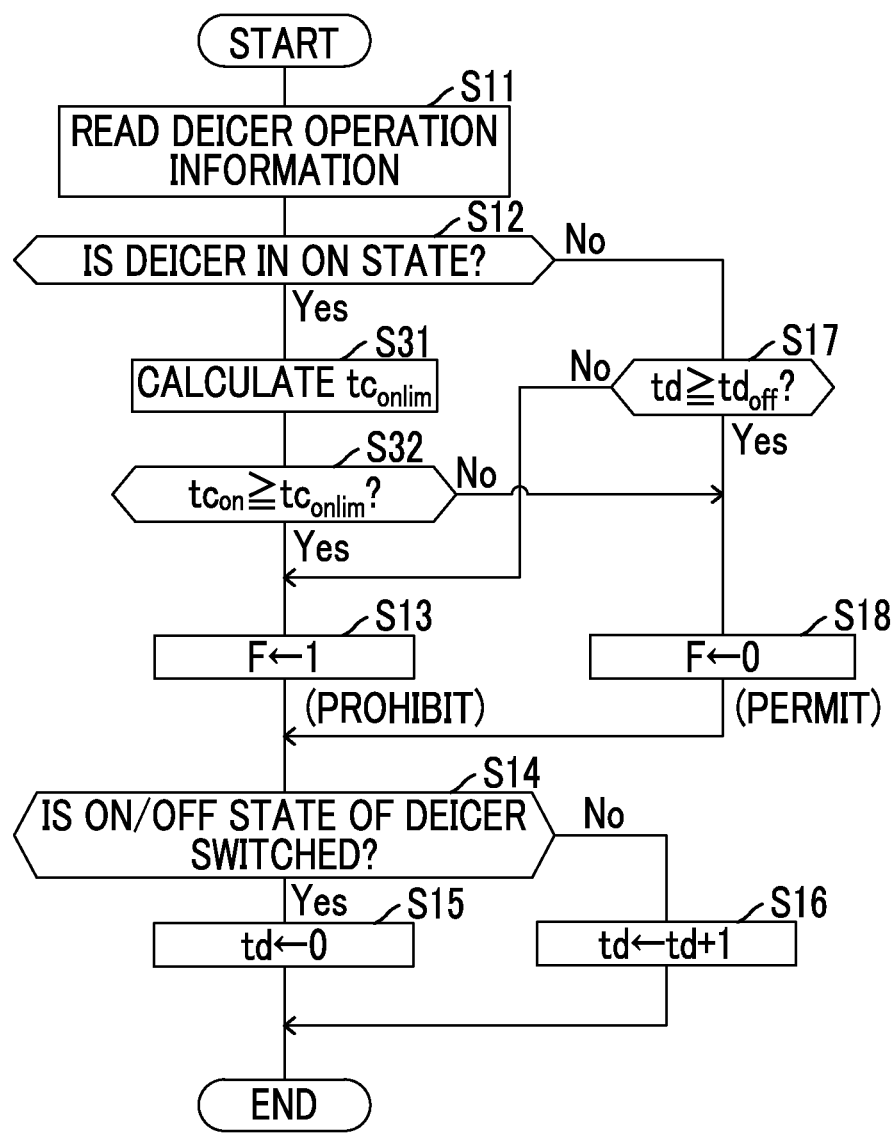
FIG. 8 is a flowchart illustrating prohibition flag setting routine 2.

Camera heater control process 2 is different from camera heater control process 1, in the conditions for prohibiting operation of the camera heater 80. Accordingly, when camera heater control process 2 is performed, the second camera heater control unit 72 repeatedly performs prohibition flag setting routine 2 (FIG. 8) different from prohibition flag setting routine 1 with a predetermined calculation cycle. The second camera heater control unit 72 repeatedly performs camera heater control routine 1 (FIG. 6) in parallel with prohibition flag setting routine 2 with a predetermined calculation cycle. Prohibition flag setting routine 2 includes the processes of Steps S31 and S32 in addition to prohibition flag setting routine 1. Prohibition flag setting routine 2 will be described below, where the processes common to prohibition flag setting routine 1 will be referenced by common step signs in the drawings and description thereof will not be repeated.

<Prohibition flag setting routine 2> When it is determined in Step S12 that the deicer 40 is operating, the second camera heater control unit 72 performs the process of Step S31. The second camera heater control unit 72 calculates the variable operation upper-limit time tconlim using Equation (1) in Step S31. In this case, the operation duration tdon of the deicer 40 in Equation (1) can be calculated from a deicer timer value td (which is set in Steps S15 and S16). In this case, the operation duration tdon of the deicer 40 is set to zero when the deicer 40 does not operate, and is set to the same value as the deicer timer value td when the deicer 40 operates.

Subsequently, the second camera heater control unit 72 determines whether the operating time tcon of the camera heater 80 is equal to or greater than the variable operation upper-limit time tconlim in Step S32. The operating time tcon of the camera heater 80 can be calculated from the camera heater timer value tc. The camera heater timer value tc is calculated in Steps S26 and S27 in camera heater control routine 1. In this case, the operating time tcon of the camera heater 80 is set to zero when the camera heater 80 does not operate, and is set to the same value as the camera heater timer value tc when the camera heater 80 operates.

When the operating time tcon of the camera heater 80 is less than the variable operation upper-limit time tconlim (NO in S32), the second camera heater control unit 72 sets the prohibition flag F to "0" in Step S18. On the other hand, when the operating time tcon of the camera heater 80 is equal to or greater than the variable operation upper-limit time tconlim (YES in S32), the second camera heater control unit 72 sets the prohibition flag F to "1" in Step S13.

Accordingly, while the deicer 40 is operating, the variable operation upper-limit time tconlim becomes shorter with the lapse of time (as the operating time of the deicer 40 becomes longer). Accordingly, as illustrated in FIG. 7, the time in which the camera heater 80 can operate becomes shorter with the lapse of time from time t5 which is an operation start time point of the deicer 40. At a time point at which the operating time of the camera heater 80 reaches the variable operation upper-limit time tconlim (time t6), operation of the camera heater 80 is stopped.

In camera heater control process 2, when the operating time tcon of the camera heater 80 is equal to or greater than the variable operation upper-limit time tconlim which is calculated by Equation (1), the camera heater 80 is maintained in a stopped state based on the estimation result that the camera heater 80 is potentially overheated. In camera heater control process 2, even in a predetermined period after operation of the camera heater 80 is stopped, the camera heater 80 is maintained in a stopped state based on the estimation result that the camera heater 80 is potentially overheated, similarly to camera heater control process 1.

According to the above-mentioned window glass heating device that performs camera heater control process 2, operation of the camera heater 80 is limited when it is estimated that the camera heater 80 is potentially overheated by heat applied from the deicer 40 to the camera heater 80 based on the current operating state of the deicer 40 and the operation history of the deicer 40. Accordingly, the camera heater 80 is prevented from being overheated. As a result, the above-mentioned problem in the camera heater 80 does not occur and an external scene can be imaged well using the camera 65 via the front glass FG (the external scene can be sensed well). Since the overheated state of the camera heater 80 can be determined without using a temperature sensor, it is possible to put the window glass heating device into practice at low costs.

<Camera heater control process 3> A third example of the camera heater control process (hereinafter referred to as camera heater control process 3) will be described below. In camera heater control process 1 and camera heater control process 2, operation of the camera heater 80 is prohibited based on the operating time and the stopping time of the deicer 40. On the other hand, in camera heater control process 3, a temperature of the camera heater 80 is estimated and operation of the camera heater 80 is controlled such that the estimated temperature is maintained within a predetermined temperature range. Hereinafter, the camera heater control unit 70 performing camera heater control process 3 is referred to as a third camera heater control unit 73.

Figure 9:
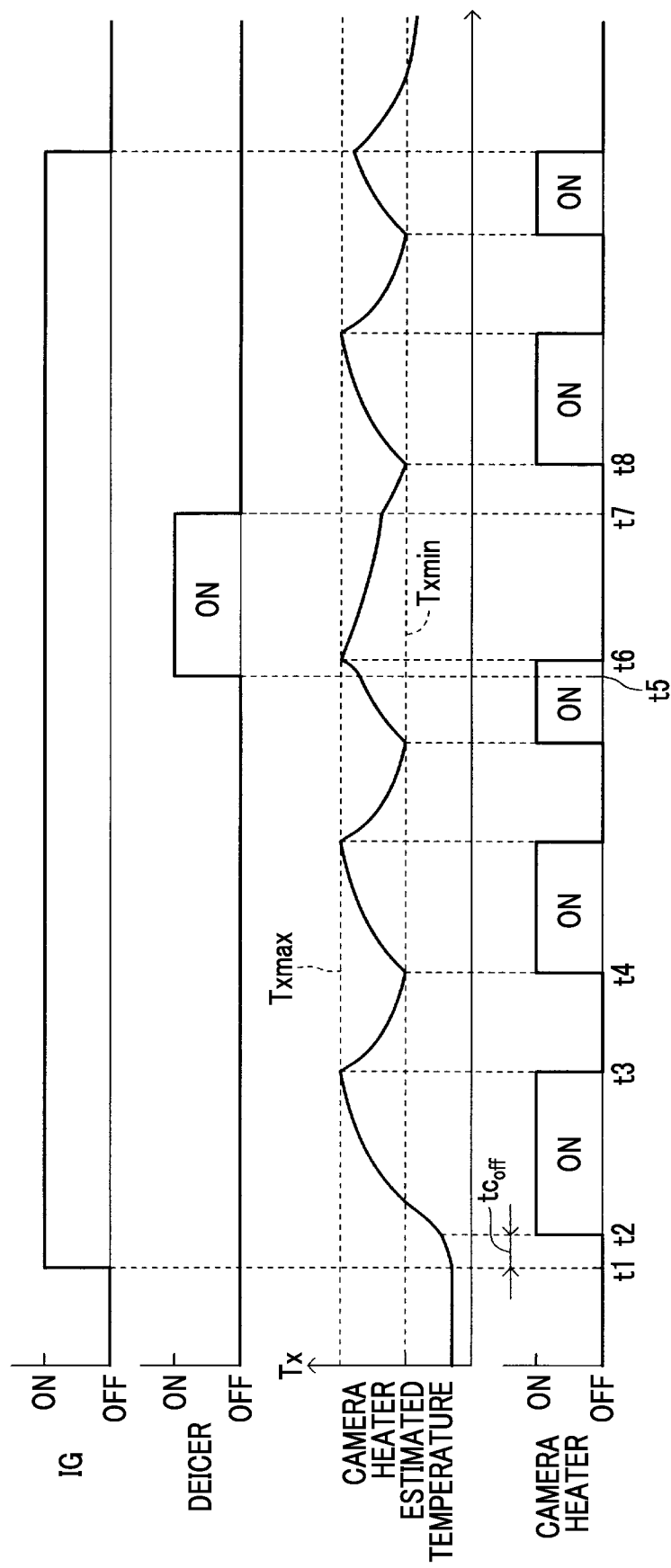
FIG. 9 is a timing chart illustrating a state of an ignition switch, an operating state of a deicer, an operating state of a camera heater, and a variation of an estimated temperature of the camera heater.

For example, as illustrated in FIG. 9, the third camera heater control unit 73 controls operation of the camera heater 80 such that the estimated temperature (the temperature of the hood 67) Tx of the camera heater 80 is within a range between a lower limit value Tmin and an upper limit value Tmax. In this embodiment, the estimated temperature Tx of the camera heater 80 is calculated using the operating time of the deicer 40, the outside air temperature around the vehicle, the vehicle speed, the source voltage, and the heating (defogger) operating state as parameters.

In this embodiment, the estimated temperature Tx is calculated by Equation (2). $Tx=Ti+(\Delta Td(t)+\Delta Tch(t)-\Delta Ta(t)+\Delta Tac(t))$ ... (2) Here, Ti denotes an initial temperature of the camera heater 80, and an outside air temperature is used. The second term or terms subsequent thereto on the right side are terms indicating a temperature variation after the ignition switch is turned on, where $\Delta Td(t)$ denotes a deicer operation increase term, $\Delta Tch(t)$ denotes a camera heater operation increase term, $\Delta Ta(t)$ denotes a running wind decrease term, and $\Delta Tac(t)$ denotes a heating operation increase term. Here, t denotes time.

$\Delta Td(t)$ is a temperature increase by which the temperature of the camera heater 80 increases and which is determined depending on the operating time of the deicer 40. The operating time of the deicer 40 is an accumulated time in which the deicer 40 operates after the ignition switch is turned on (currently turned on). For example, the third camera heater control unit 73 stores a map in which a relationship between the operating time of the deicer 40 and $\Delta Td(t)$ which increases with an increase in the operating time is set and calculates $\Delta Td(t)$ with reference to the map. In this case, since an amount of heat generated from the deicer 40 per unit time varies depending on the source voltage output from the power supply device 100, it is preferable that ΔTd(t) be corrected to a higher value as the source voltage becomes higher (for example, ΔTd(t) is multiplied by a correction coefficient depending on the source voltage).

ΔTch(t) is a temperature increase by which the temperature of the camera heater 80 increases and which is determined depending on the operating time of the camera heater 80. The operating time of the camera heater 80 is an accumulated time in which the camera heater 80 operates after the ignition switch is turned on (currently turned on). For example, the third camera heater control unit 73 stores a map in which a relationship between the operating time of the camera heater 80 and ΔTch(t) which increases with an increase in the operating time is set and calculates ΔTch(t) with reference to the map. In this case, since an amount of heat generated from the camera heater 80 per unit time varies depending on the source voltage output from the power supply device 100, it is preferable that ΔTch(t) be corrected to a higher value as the source voltage becomes higher (for example, ΔTch(t) is multiplied by a correction coefficient depending on the source voltage).

ΔTa(t) is a temperature decrease by which the temperature of the camera heater 80 decreases by cooling of the front glass FG due to a running wind and is calculated based on the outside air temperature and the vehicle speed. For example, the third camera heater control unit 73 stores a map in which a relationship between the vehicle speed and the temperature decreasing per unit time is set for each of a plurality of outside air temperatures, and calculates ΔTa(t) which is an accumulated value of the temperature decrease with reference to the map. In this case, as the vehicle speed becomes higher, the absolute value of ΔTa(t) is set to be larger.

ΔTac(t) is a temperature increase by which the temperature of the camera heater 80 increases by heating of the front glass FG due to heating (hot air from the defogger) and is calculated based on the heating operation time. For example, the third camera heater control unit 73 stores a map in which a relationship between the heating operation time and ΔTac(t) which increases as the heating operation time increases is set and calculates ΔTac(t) with reference to the map.

Figure 10:
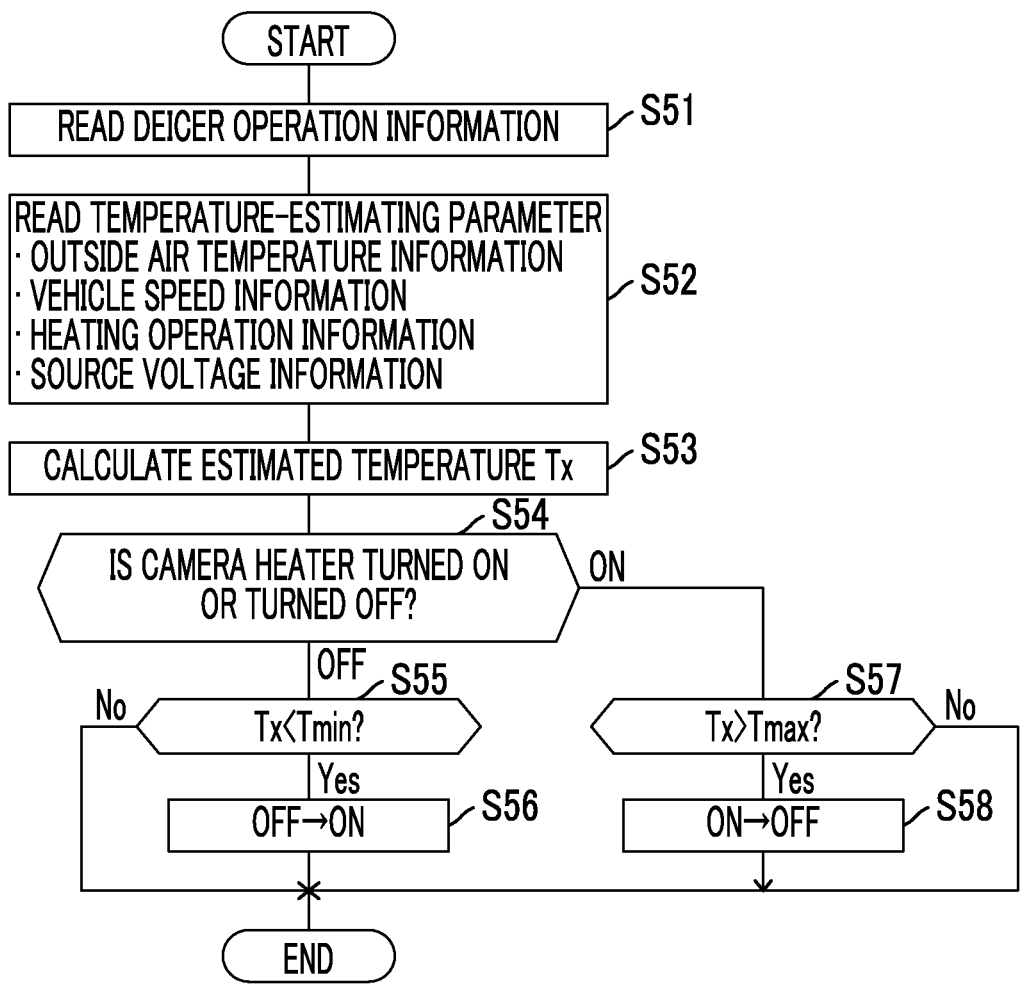
FIG. 10 is a flowchart illustrating camera heater control routine 3.

<Camera heater control routine 3> FIG. 10 illustrates camera heater control routine 3. The third camera heater control unit 73 repeatedly performs camera heater control routine 3 with a predetermined calculation cycle in a period in which the ignition switch is turned on.

When camera heater control routine 3 is started, the third camera heater control unit 73 reads deicer operation information transmitted from the air-conditioning ECU 10 in Step S51. Subsequently, the third camera heater control unit 73 reads parameters required for estimating the temperature of the camera heater 80 in Step S52. In this embodiment, the third camera heater control unit 73 reads information on the outside air temperature which is detected by the outside air temperature sensor 92, information on the vehicle speed which is detected by a vehicle speed sensor 91, heating (defogger) operation information which is transmitted from the air-conditioning ECU 10, and information on the source voltage which is detected by the voltage sensor 93.

Subsequently, the third camera heater control unit 73 calculates the estimated temperature Tx of the camera heater 80 based on Equation (2) in Step S53.

Subsequently, in Step S54, the third camera heater control unit 73 determines whether the camera heater 80 is operating (the camera heater relay 82 is turned on) or stopped (the camera heater relay 82 is turned off). Since the camera heater 80 stops at the time of starting of this routine, the third camera heater control unit 73 determines whether the estimated temperature Tx is lower than a first threshold value Txmin in Step S55.

When the estimated temperature Tx is lower than the lower limit value Tmin (YES in S55), the third camera heater control unit 73 starts operation of the camera heater 80 in Step S56 (turns on the camera heater relay 82) and then temporarily ends this routine. On the other hand, when the estimated temperature Tx is equal to or higher than the lower limit value Tmin (NO in S55), the third camera heater control unit 73 skips the process of Step S56 and temporarily ends this routine.

Although not illustrated in the flowchart, the third camera heater control unit 73 skips the process of Step S56 not to start operation of the camera heater 80 in a predetermined time tcoff immediately after the ignition switch is turned on (a period from time t1 to time t2 in FIG. 9). In this case, calculation of the estimated temperature Tx of the camera heater 80 is repeatedly performed.

When this process is repeated and operation of the camera heater 80 is started in Step S56, the third camera heater control unit 73 performs the process of Step S57 after the estimated temperature Tx is calculated. In step S57, the third camera heater control unit 73 determines whether the calculated estimated temperature Tx is higher than an upper limit Tmax. When the estimated temperature Tx is not higher than the upper limit Tmax, this routine is temporarily ended. When this process is repeated and the estimated temperature Tx is higher than the upper limit value Tmax due to operation of the camera heater 80 (YES in S57), the third camera heater control unit 73 estimates that there is a likelihood that the camera heater 80 will be overheated and stops operation of the camera heater 80 in Step S58 (turns off the camera heater relay). In this way, operation of the camera heater 80 is limited.

The third camera heater control unit 73 repeatedly performs this routine with a predetermined calculation cycle. Accordingly, operation of the camera heater 80 (the supply of power to the camera electric heating wire 81) is controlled such that the estimated temperature Tx of the camera heater 80 is within the range between the lower limit value Tmin and the upper limit value Tmax as illustrated in FIG. 9. In this example, operation of the camera heater 80 is stopped when the estimated temperature Tx is higher than the upper limit value Tmax at time t3, and operation of the camera heater 80 is restarted when the estimated temperature Tx is lower than the lower limit value Tmin at time t4.

When operation of the deicer 40 is started while the camera heater 80 is operating, an increase gradient of the estimated temperature Tx increases from that time t5. This is because the deicer operation increase term ΔTd(t) acts in Equation (2) for calculating the estimated temperature Tx. Accordingly, the estimated temperature Tx becomes higher than the upper limit value Tmax earlier than when the deicer 40 does not operate (time t6). In this way, operation of the camera heater 80 is stopped at time t6. Accordingly, the operating time of the camera heater 80 is limited to be shorter.

In a period in which the deicer 40 operates even after the camera heater 80 is stopped (time t6), the decrease gradient of the estimated temperature Tx is smaller (the temperature decreases slowly) than when the deicer 40 does not operate, due to an influence of radiant heat applied from the deicer 40 to the camera heater 80. Thereafter, the decrease gradient of the estimated temperature Tx is returned to a normal gradient from time t7 at which operation of the deicer 40 is stopped. In this way, operation of the camera heater 80 is started at time t8.

According to the above-mentioned window glass heating device that performs camera heater control process 3, the estimated temperature Tx of the camera heater 80 is calculated based on the outside air temperature information, the vehicle speed information, the heating operation information, and the source voltage information in addition to the operation information of the deicer 40, and operation of the camera heater is controlled such that the estimated temperature Tx is within a predetermined temperature range. Accordingly, the estimated temperature Tx of the camera heater 80 is calculated to be higher as the operating time of the deicer becomes longer, the outside air temperature becomes higher, the vehicle speed becomes lower, the operating time of the defogger becomes longer, and the source voltage becomes higher. As a result, the operating time of the camera heater 80 is limited to be shorter as the operating time of the deicer becomes longer, the outside air temperature becomes higher, the vehicle speed becomes lower, the operating time of the defogger becomes longer, and the source voltage becomes higher. Accordingly, the camera heater 80 is prevented from being overheated. As a result, the above-mentioned problem in the camera heater 80 does not occur and an external scene can be imaged well using the camera 65 via the front glass FG (the external scene can be sensed well). Since the overheated state of the camera heater 80 can be determined without using a temperature sensor, it is possible to put the window glass heating device into practice at low costs.

The third camera heater control unit 73 may calculate the estimated temperature Tx of the camera heater 80 based on at least one of the outside air temperature information, the vehicle speed information, the heating operation information, and the source voltage information and the operation information of the deicer 40, and may control operation of the camera heater 80 based on the estimated temperature Tx.

Modified examples which can be applied to camera heater control routines 1, 2, and 3 will be described below.

<camera heater initial waiting time setting process 1> In camera heater control routines 1, 2, and 3, the non-operating period in which operation of the camera heater 80 is prohibited is set immediately after the ignition switch is turned on. Camera heater initial waiting time setting process 1 is a process of setting the stop setting time tcoff immediately after the ignition switch is turned on to be variable.

Figure 11:
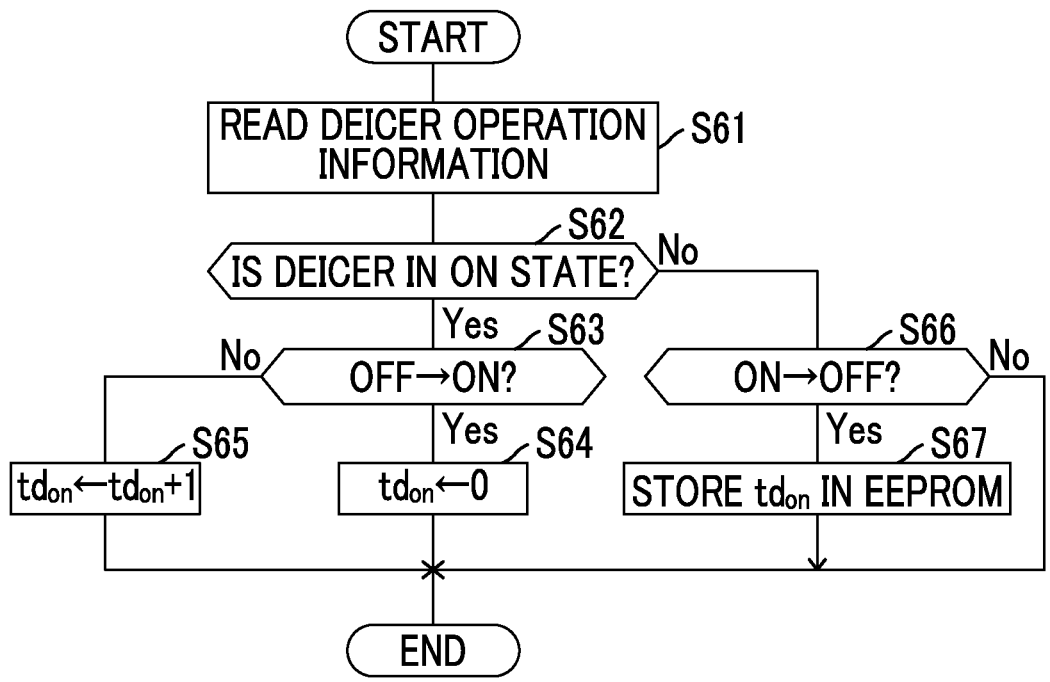
FIG. 11 is a flowchart illustrating deicer operating time storing routine 1.
Figure 12:
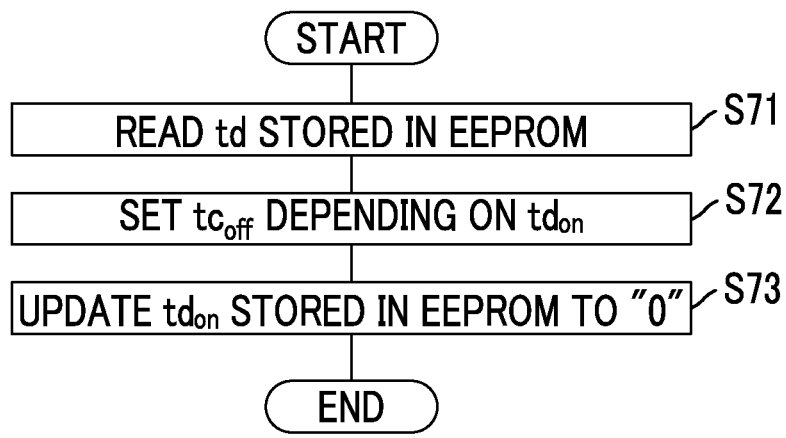
FIG. 12 is a flowchart illustrating camera heater initial waiting time setting routine 1.

The camera heater control unit 70 (which may be any one of the camera heater control units 71, 72, and 73) performs deicer operating time storing routine 1 illustrated in FIG. 11 and camera heater initial waiting time setting routine 1 illustrated in FIG. 12 as camera heater initial waiting time setting process 1. First, deicer operating time storing routine 1 will be described below. The camera heater control unit 70 repeatedly performs deicer operating time storing routine 1 illustrated in FIG. 11 with a predetermined calculation cycle in a period in which the ignition switch is turned on.

When deicer operating time storing routine 1 is started, the camera heater control unit 70 reads deicer operation information which is transmitted from the air-conditioning ECU 10 in Step S61 and determines whether the deicer 40 is operating (the deicer relay is turned on) in Step S62. When the deicer 40 is operating (YES in S62), the camera heater control unit 70 determines whether it is immediately after operation of the deicer 40 is started in Step S63. That is, it is determined whether the deicer operation information read in a previous calculation cycle indicates that the deicer 40 is not operating and whether the deicer operation information read in a current calculation cycle indicates that the deicer 40 is operating.

When it is determined that it is immediately after operation of the deicer 40 is started (YES in S63), the camera heater control unit 70 clears a deicer ON timer value tdon to zero in Step S64. On the other hand, when it is determined that it is not immediately after operation of the deicer 40 is started (NO in S63), the camera heater control unit 70 increases the deicer ON timer value tdon by "1" in Step S65. Accordingly, the deicer ON timer value tdon indicates a time in which the deicer 40 is operating.

On the other hand, when it is determined in Step S62 that the deicer 40 is not operating, the camera heater control unit 70 determines whether it is immediately after operation of the deicer 40 is stopped in Step S66. That is, is the camera heater control unit 70 determines whether the deicer operation information read in a previous calculation cycle indicates that the deicer 40 is operating and whether the deicer operation information read in a current calculation cycle indicates that the deicer 40 is not operating.

When it is immediately after operation of the deicer 40 is stopped (YES in S66), the camera heater control unit 70 stores the deicer ON timer value tdon in a nonvolatile memory (EEPROM) and temporarily ends this routine. Accordingly, information indicating the time (the deicer operating time) in which the deicer 40 is operating previously is stored. Thereafter, the process of Step S67 is skipped in the period in which operation of the deicer 40 is stopped (NO in S66).

The camera heater control unit 70 repeatedly performs deicer operating time storing routine 1 with a predetermined calculation cycle. Accordingly, the previous deicer operating time is stored and updated in the nonvolatile memory whenever operation of the deicer 40 is stopped. The newest value of the deicer operating time may be stored and maintained in the nonvolatile member even when the ignition switch is turned off.

The deicer operating time which has been stored in the nonvolatile memory in this way is used to set the non-operating period in which operation of the camera heater 80 is prohibited immediately after the ignition switch is turned on.

The camera heater control unit 70 performs camera heater initial waiting time setting routine 1 illustrated in FIG. 12 one time when the ignition switch is turned on. The camera heater control unit 70 first reads the deicer operating time tdon stored in the nonvolatile memory in Step S71. Subsequently, the camera heater control unit 70 sets an initial waiting time tcoff which is the stop setting time tcoff in which operation of the camera heater 80 is prohibited immediately after the ignition switch is turned on based on the deicer operating time tdon in Step S72.

Figure 13:
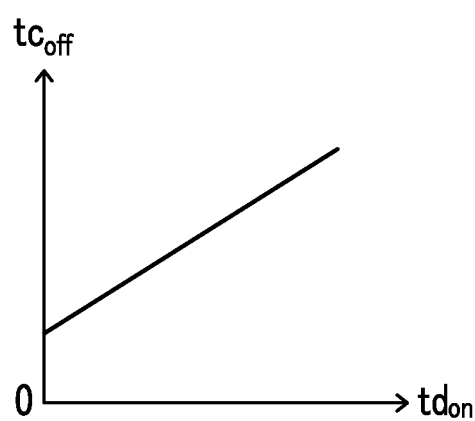
FIG. 13 is a graph illustrating an initial waiting time map.

The camera heater control unit 70 stores an initial waiting time map having characteristics illustrated in FIG. 13. The initial waiting time map is a map in which the initial waiting time tcoff is set depending on the deicer operating time tdon, and has characteristics that the initial waiting time tcoff is set to increase as the deicer operating time tdon increases.

The camera heater control unit 70 sets the initial waiting time tcoff with reference to the initial waiting time map in Step S72. Subsequently, the camera heater control unit 70 clears and updates the deicer operating time tdon stored in the nonvolatile memory to zero in Step S73, and ends camera heater initial waiting time setting routine 1.

Immediately after the ignition switch is turned on, the camera heater control unit 70 prohibits operation of the camera heater 80 in a period in which the initial waiting time tcoff elapses using the initial waiting time tcoff set in Step S72. A predetermined constant stop setting time tcoff is used for a second period in which the camera heater 80 is stopped or periods subsequent thereto.

Figure 14:
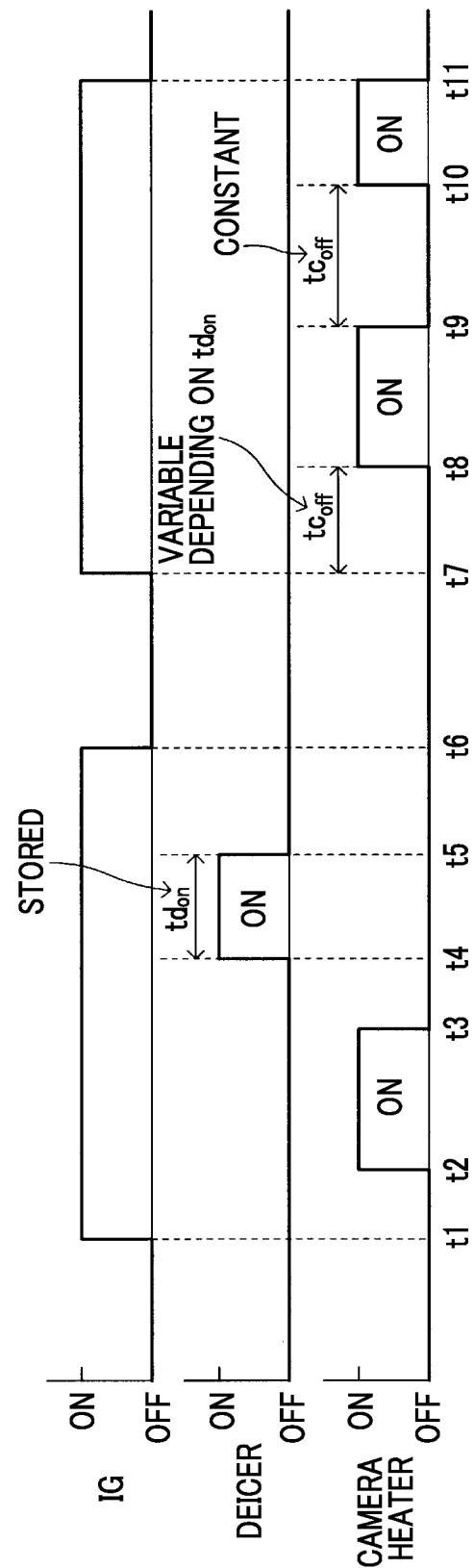
FIG. 14 is a timing chart illustrating a state of an ignition switch, an operating state of a deicer, and an operating state of a camera heater.

When the deicer 40 operates, heat generated therefrom may remain when the ignition switch is turned on next time. There is a likelihood that the initial temperature (the temperature when the ignition switch is turned on next time) of the camera heater 80 will be higher as the operating time of the deicer 40 becomes longer. Therefore, in camera heater initial waiting time setting routine 1, as illustrated in FIG. 14, the initial waiting time tcoff (a time from t7 to t8) in the period (a time from t7 to t11) in which the ignition switch is currently turned on is set as described above based on the operating time tdon (a time from t4 to t5) of the deicer 40 in the period (the time from t1 to t6) in which the ignition switch is previously turned on. A predetermined constant stop setting time tcoff is used for a second period in which the camera heater 80 is stopped or periods subsequent thereto (the time from t9 to t10).

Accordingly, by applying the initial waiting time tcoff set in camera heater initial waiting time setting process 1 to the first stop setting time tcoff in camera heater control routines 1, 2, and 3, it is possible to more appropriately prevent the camera heater 80 from being overheated.

<Camera heater initial waiting time setting process 2> In camera heater initial waiting time setting process 1, the operating time of the deicer 40 is measured and the initial waiting time tcoff immediately after the ignition switch is turned on next time is set, but when it can be determined whether the deicer 40 has operated without measuring the operating time of the deicer 40, this information can be usefully used to set the initial waiting time tcoff to some extent. In camera heater initial waiting time setting process 2, an operation history indicating whether the deicer 40 has operated is stored in the nonvolatile memory and the initial waiting time tcoff is set to two types of values based on the operation history.

Figure 15:
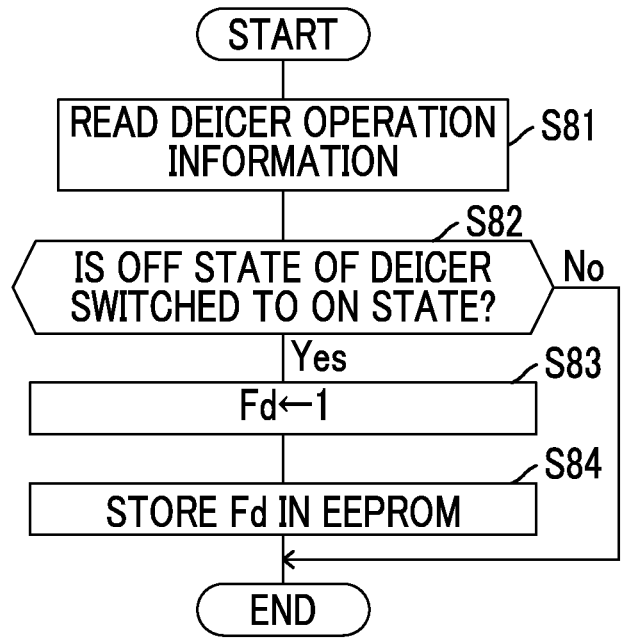
FIG. 15 is a flowchart illustrating a deicer operation history storing routine.
Figure 16:
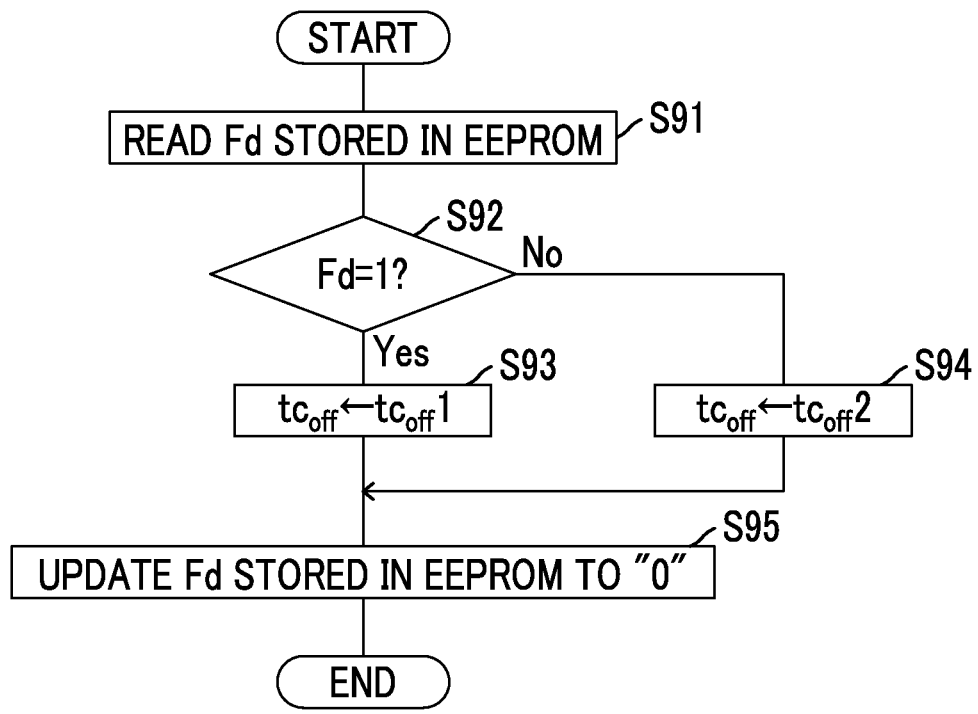
FIG. 16 is a flowchart illustrating camera heater initial waiting time setting routine 2.

The camera heater control unit 70 (which may be any one of the camera heater control units 71, 72, and 73) performs a deicer operation history storing routine illustrated in FIG. 15 and camera heater initial waiting time setting routine 2 illustrated in FIG. 16 as camera heater initial waiting time setting process 2. First, the deicer operation history storing routine will be described below. The camera heater control unit 70 repeatedly performs the deicer operation history storing routine illustrated in FIG. 15 with a predetermined calculation cycle in the period in which the ignition switch is turned on.

When the deicer operation history storing routine is started, the camera heater control unit 70 reads the deicer operation information which is transmitted from the air-conditioning ECU 10 in Step S81 and determines whether operation of the deicer 40 is started in Step S82. That is, the camera heater control unit 70 determines whether the deicer operation information read in a previous calculation cycle indicates that the deicer 40 is not operating and whether the deicer operation information read in a current calculation cycle indicates that the deicer 40 is operating. When operation of the deicer 40 is not started (NO in S82), this routine is temporarily ended.

When this process is repeatedly performed and it is detected that operation of the deicer 40 is started (YES in S82), the camera heater control unit 70 sets a deicer operation flag Fd to "1" in Step S83. The deicer operation flag Fd is information indicating whether the deicer 40 has operated and an initial value thereof when the ignition switch is turned on is set to "0."

Subsequently, the camera heater control unit 70 stores the deicer operation flag Fd in the nonvolatile memory in Step S84 and ends this routine. Accordingly, when operation of the deicer 40 is detected even once while the ignition switch is turned on, the deicer operation flag Fd indicating the operation history thereof is stored in the nonvolatile memory.

The deicer operation flag Fd stored in the nonvolatile memory in this way is used to set the non-operating period in which operation of the camera heater 80 is prohibited immediately after the ignition switch is turned on next time.

When the ignition switch is turned on, the camera heater control unit 70 performs camera heater initial waiting time setting routine 2 illustrated in FIG. 16 one time. First, the camera heater control unit 70 reads the deicer operation flag Fd stored in the non-volatile memory in Step S91. Subsequently, the camera heater control unit 70 determines whether the deicer operation flag Fd is "1" in Step S92.

When the deicer operation flag Fd is "1," the camera heater control unit 70 sets the initial waiting time tcoff which is the stop setting time tcoff in which operation of the camera heater 80 is prohibited immediately after the ignition switch is turned on to a first initial waiting time tcoff1 in Step S93. On the other hand, when the deicer operation flag Fd is "0," the camera heater control unit 70 sets the initial waiting time tcoff to a second initial waiting time tcoff2 in Step S94. The first initial waiting time tcoff1 is set to be longer than the second initial waiting time tcoff2 (tcoff1>tcoff2).

Subsequently, the camera heater control unit 70 clears and updates the value of the deicer operation flag Fd stored in the nonvolatile memory to zero in Step S95 and ends camera heater initial waiting time setting routine 2.

Immediately after the ignition switch is turned on, the camera heater control unit 70 prohibits operation of the camera heater 80 in the period in which the initial waiting time tcoff elapses using the initial waiting time tcoff set in Steps S93 and S94. A predetermined constant stop setting time tcoff is used for a second period in which operation of the camera heater 80 is stopped or periods subsequent thereto.

Accordingly, by applying the initial waiting time tcoff set in camera heater initial waiting time setting process 2 to the first stop setting time tcoff in camera heater control routines 1, 2, and 3, it is possible to more appropriately prevent the camera heater 80 from being overheated.

Figure 17:
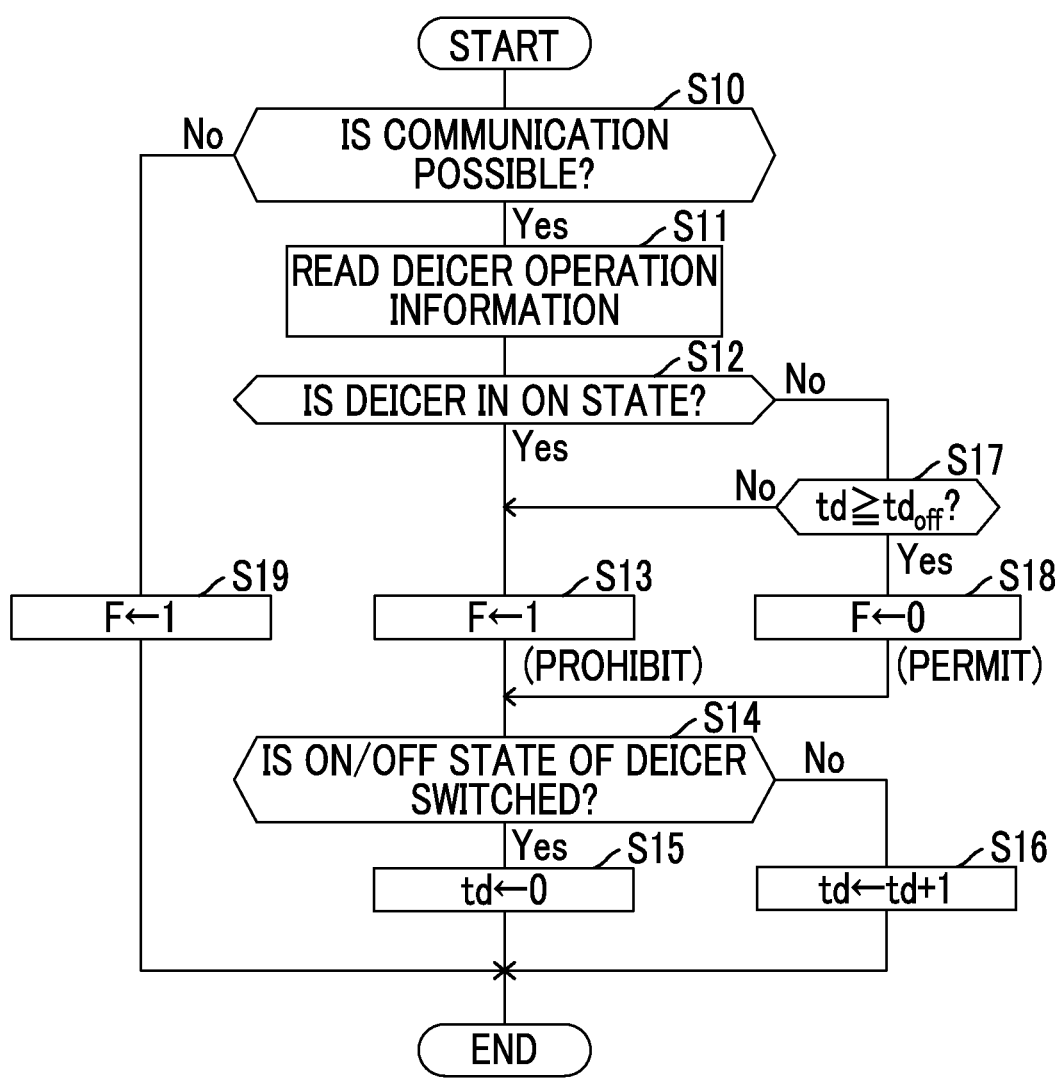
FIG. 17 is a flowchart illustrating a modified example of prohibition flag setting routine 1.

<Process when communication is abnormal> The air-conditioning ECU 10 and the camera ECU 50 are connected to transmit and receive information to and from each other via a CAN, but when communication between both ECUs 10 and 50 is cut off, the camera heater control unit 70 cannot receive the deicer operation information. In this case, since the camera heater control unit 70 cannot understand the operating state of the deicer 40, the camera heater 80 is maintained in a stopped state. For example, in prohibition flag setting routine 1, as illustrated in FIG. 17, the processes of Steps S10 and S19 have only to be added thereto. In a modified example of prohibition flag setting routine 1, the camera heater control unit 71 determines whether communication between the air-conditioning ECU 10 and the camera ECU 50 is normal in Step S10, and sets the prohibition flag F to "1" in Step S19 when communication between both ECUs 10 and 50 is cut off (when the camera heater control unit 71 cannot receive the deicer operation information). Accordingly, when communication between both ECUs 10 and 50 is cut off, operation of the camera heater 80 is prohibited.

Figure 18:
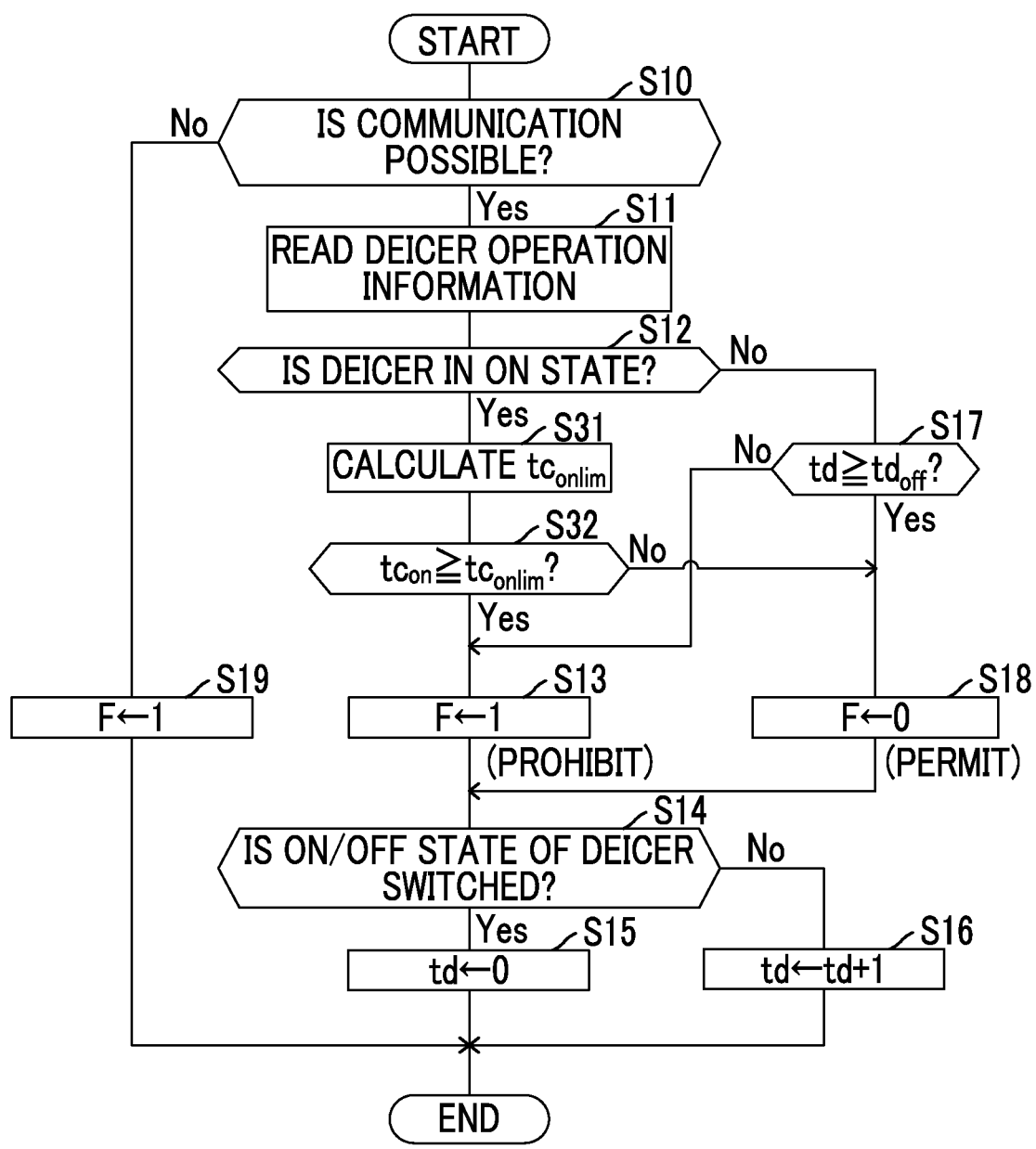
FIG. 18 is a flowchart illustrating a modified example of prohibition flag setting routine 2.

Similarly, in prohibition flag setting routine 2, as illustrated in FIG. 18 (a modified example of prohibition flag setting routine 2), the processes of Steps S10 and S19 have only to be added thereto.

Figure 19:
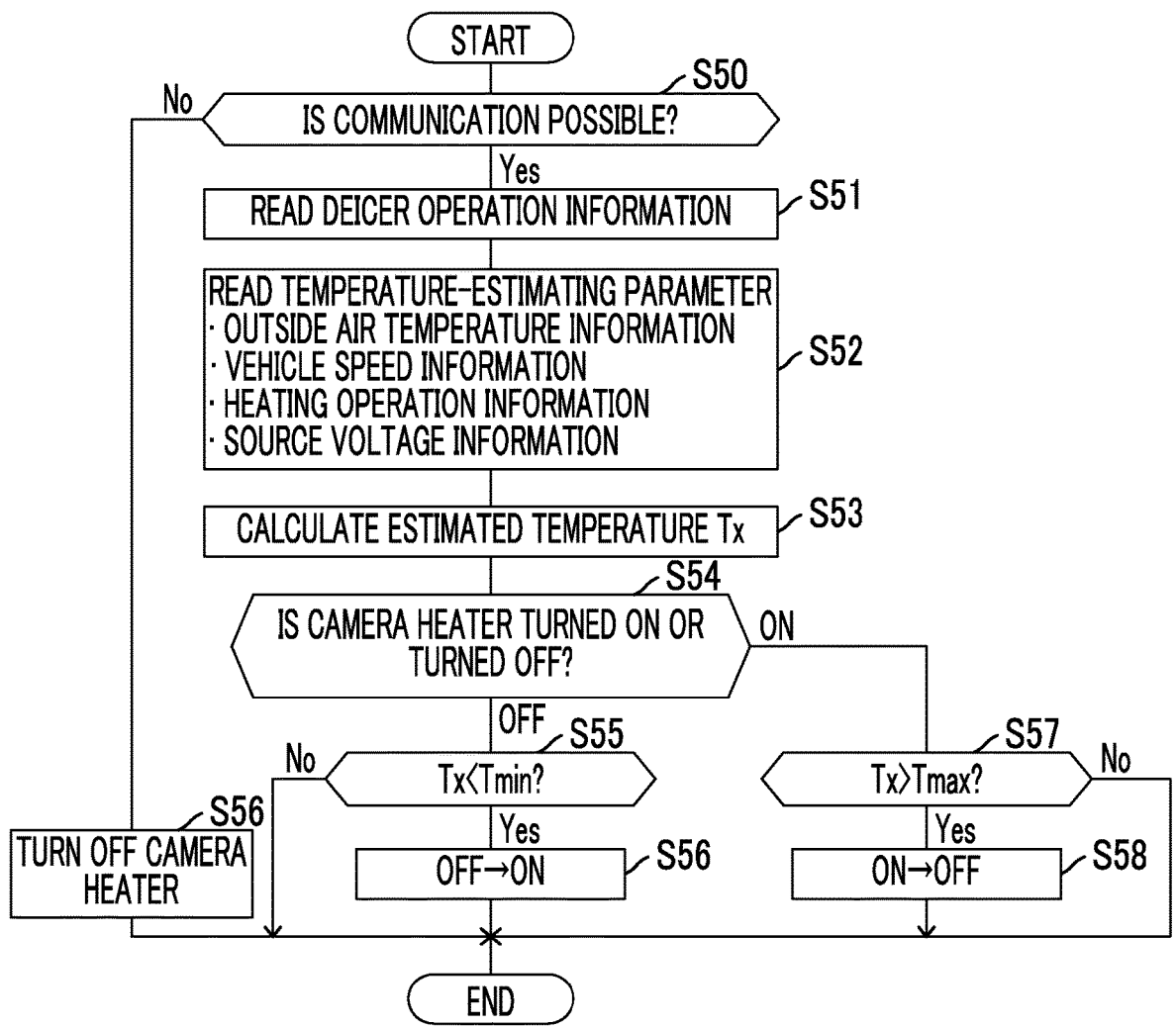
FIG. 19 is a flowchart illustrating a modified example of camera heater control routine 3.

In camera heater control routine 3, as illustrated in FIG. 19, the processes of Steps S50 and S59 have only to be added thereto. In a modified example of camera heater control routine 3, the camera heater control unit 73 determines whether communication between the air-conditioning ECU 10 and the camera ECU 50 is normal in Step S50, and maintains the camera heater 80 in a stopped state in Step S59 when communication between both ECUs 10 and 50 is cut off (when the camera heater control unit 73 cannot receive the deicer operation information). That is, the camera heater 80 is stopped when the camera heater 80 operates, and the stopped state is maintained when the camera heater 80 is stopped.

Accordingly, even when communication between the air-conditioning ECU 10 and the camera ECU 50 is cut off, it is possible to prevent the camera heater 80 from being overheated.

Figure 20:
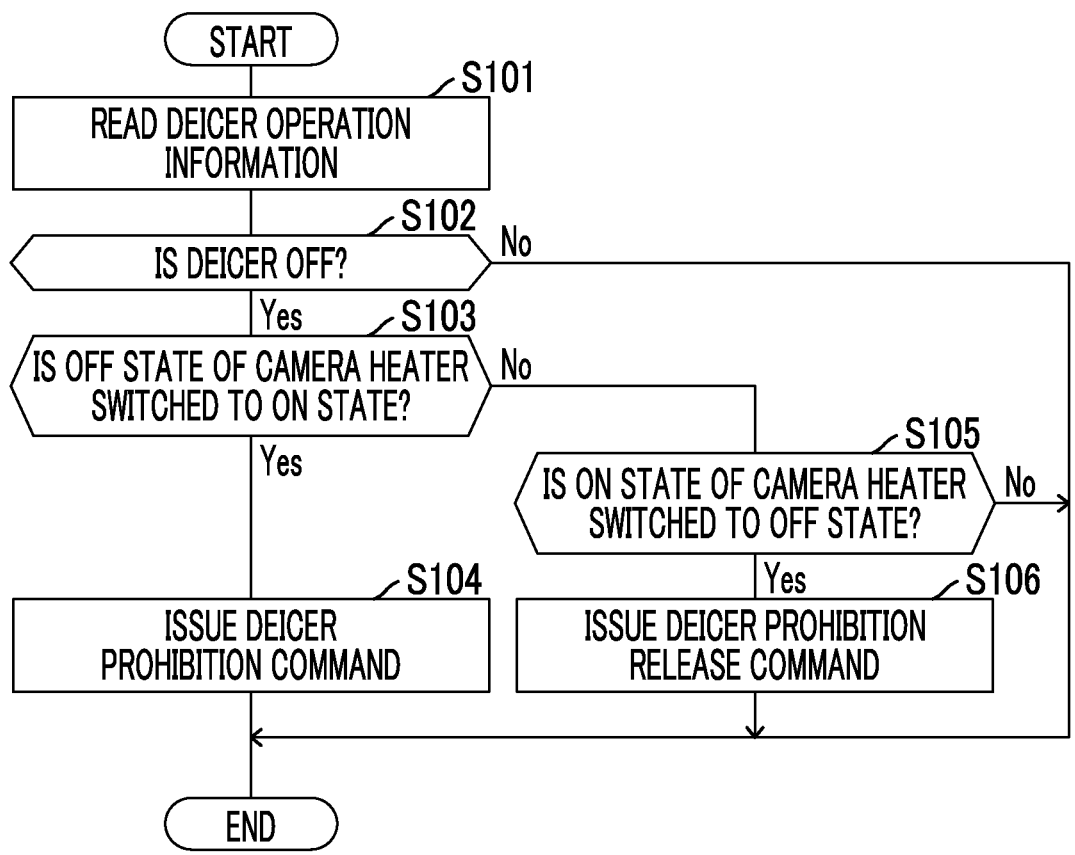
FIG. 20 is a flowchart illustrating a deicer operation limiting routine.

<Operation limit of deicer> For example, when operation of the camera heater 80 is started in a state in which the deicer 40 is not operating, the camera heater 80 may be prevented from being overheated by prohibiting operation of the deicer 40, that is, causing the deicer 40 not to operate even when the deicer switch 45 is operated. In this case, for example, the camera heater control unit 70 repeatedly performs a deicer operation limiting routine illustrated in FIG. 20 with a predetermined calculation cycle. The deicer operation limiting routine is performed in parallel with any one of camera heater control routines 1, 2, and 3.

When the deicer operation limiting routine is started, the camera heater control unit 70 reads the deicer operation information in Step S101 and determines whether the deicer 40 is operating in Step S102. When the deicer 40 is not operating, the camera heater control unit 70 determines whether a time to start operation of the camera heater 80 arrives in Step S103. When a time to start operation of the camera heater 80 does not arrive (NO in S103), the camera heater control unit 70 determines whether a time to stop operation of the camera heater 80 arrives in Step S105. When a time to stop operation of the camera heater 80 does not arrive, the camera heater control unit 70 temporarily ends the deicer operation limiting routine.

When the deicer operation limiting routine is repeatedly performed with a predetermined calculation cycle and the time to start operation of the camera heater 80 arrives (YES in S103), the camera heater control unit 70 transmits a deicer prohibition command to the deicer control unit 30 of the air-conditioning ECU 10 in Step S104. Thereafter, when the time to stop operation of the camera heater 80 arrives (YES in S150), the camera heater control unit 70 transmits a deicer prohibition release command to the deicer control unit 30 in Step S106.

When the deicer control unit 30 receives the deicer prohibition command transmitted from the camera ECU 50, operation of the deicer 40 is prohibited until the deicer prohibition release command is received. That is, even when a user operates the deicer switch 45, the deicer control unit does not accept the switch operation. Accordingly, operation of the deicer 40 is not started. Accordingly, operation of the deicer 40 is not started while the camera heater 80 is operating and it is thus possible to prevent the camera heater 80 from being overheated.

While the window glass heating device according to an embodiment has been described above, the disclosure is not limited to the embodiment and can be modified in various forms without departing from the concept of the disclosure.

For example, in camera heater control process 2, the variable operation upper-limit time tconlim is changed by only the operation duration tdon of the deicer 40, but may be changed depending on at least one of the outside air temperature, the source voltage, the vehicle speed, and the heating (defogger) operating state in addition to the operation duration tdon of the deicer 40. In this case, the variable operation upper-limit time tconlim can be set to be variable such that it becomes shorter as the outside air temperature becomes higher, it becomes shorter as the source voltage becomes higher, and it becomes shorter as the vehicle speed becomes lower.

In this embodiment, when operation of the camera heater 80 is limited, the camera heater relay 82 is turned off to set the amount of power supplied to zero, but this need not to be performed and generation of heat of the camera heater 80 may be limited, for example, by supplying the camera electric heating wire 81 with an amount of power smaller than that in a normal state (when it is not estimated that there is a likelihood that the camera heater 80 will be overheated). In adjusting the amount of power supplied, a current value flowing in the camera electric heating wire 81 may be adjusted or a power-supply time ratio (power-supply time/ (power-supply time+non-power-supply time)) of the camera heater may be adjusted.

This embodiment provides a window glass heating device which is disposed on front window glass FG, but may be applied to a window glass heating device which is disposed on rear window glass. In this case, the camera 65 images an external scene in the rear of the vehicle from the vehicle interior via the rear window glass.

What is claimed is:

1. A window glass heating device for a vehicle, comprising:
    a deicer configured to heat a whole area of a window glass of the vehicle to defog the window glass, wherein the deicer includes an electric heating wire disposed on the whole area of the window glass and defogs the window glass by heat generated from the electric heating wire;
    a first processor configured to control the deicer by turning on or off a deicer relay to supply power or cut off the supply of power to the electric heating wire when an on or off signal is input from a deicer switch operated by a user;
    a camera heater including a camera electric heating wire and a camera heater relay, wherein the camera heater heats a camera-imaging window area which is a part of the window glass included in an imaging area of a camera that images a vehicle exterior from a vehicle interior via the window glass, and a heating area of the camera heater being included in a heating area of the deicer; and
    a second processor configured to:
        acquire deicer operation information which is information on operation of the deicer including an operating time of the deicer,
        calculate an estimated temperature of the camera heater based on the deicer operation information, and
        control supply of power to the camera heater, by turning on or off the camera heater relay to supply power or cut off the supply of power to the camera electric heating wire, such that the estimated temperature of the camera heater is within a predetermined temperature range.

2. The window glass heating device according to claim 1, wherein
the second processor is configured to
acquire the deicer operation information including information for determining whether the deicer operates, and
limit supply of power to the camera heater in a period in which the deicer operates based on the deicer operation information.

3. The window glass heating device according to claim 1, wherein
the second processor is configured to control supply of power to the camera heater such that a power-supply period in which power is supplied to the camera heater and a non-power-supply period in which power is not supplied to the camera heater are alternately repeated in a period in which an ignition switch is turned on, and
the second processor is configured to
acquire the deicer operation information including information for determining whether the deicer operates, and
set the power-supply period of the camera heater to be shorter when the deicer operates than when the deicer does not operate.

4. The window glass heating device according to claim 3, wherein
the second processor is configured to
acquire outside air temperature information indicating an outside air temperature, and
set the power-supply period of the camera heater to be shorter as the outside air temperature becomes higher.

5. The window glass heating device according to claim 3, wherein
the second processor is configured to
acquire source voltage information indicating a source voltage which is an output voltage of an on-board power supply device that supplies power to the camera heater, and
set the power-supply period of the camera heater to be shorter as the source voltage becomes higher.

6. The window glass heating device according to claim 3, wherein
the second processor is configured to
acquire vehicle speed information indicating a running speed of the vehicle, and
set the power-supply period of the camera heater to be shorter as the running speed becomes lower.

7. The window glass heating device according to claim 1, wherein
the second processor is configured to
acquire outside air temperature information indicating an outside air temperature, and
set a power-supply period of the camera heater to be shorter as the outside air temperature becomes higher.

8. The window glass heating device according to claim 1, wherein
the second processor is configured to
acquire source voltage information indicating a source voltage which is an output voltage of an on-board power supply device that supplies power to the camera heater, and
set a power-supply period of the camera heater to be shorter as the source voltage becomes higher.

9. The window glass heating device according to claim 1, wherein
the second processor is configured to
acquire vehicle speed information indicating a running speed of the vehicle, and
set a power-supply period of the camera heater to be shorter as the running speed becomes lower.

10. The window glass heating device according to claim 1, wherein
when viewed from front of the vehicle, the electric heating wire of the deicer overlaps the camera.

11. The window glass heating device according to claim 1, further comprising
a camera unit that includes a bracket being fixed to the vehicle and the camera being attached to the bracket, wherein
when viewed from front of the vehicle, the electric heating wire of the deicer overlaps the camera unit.

12. The window glass heating device according to claim 1, wherein
the operating time of the deicer is an accumulated time in which the deicer operates after an ignition switch is turned off,
the second processor stores a map in which a relationship between the operating time of the deicer and a temperature increase of the camera heater, and
the second processor is configured to calculate the estimated temperature of the camera heater based on the map.

13. The window glass heating device according to claim 1, wherein
the second processor is configured to set, immediately after an ignition switch is turned on, a non-operating period in which supply of power to the camera heater is prohibited.

14. The window glass heating device according to claim 1, wherein
the second processor is configured to control supply of power to the camera heater such that the estimated temperature of the camera heater is within the predetermined temperature range, when power is supplied to the electric heating wire of the deicer.

15. The window glass heating device according to claim 1, wherein
the second processor is configured to output a prohibition command for prohibiting operation of the deicer to the first processor when it is determined that a predefined condition on an operation state of the deicer and an operation state of the camera heater is met.

* * * * *